US012753811B2

(12) United States Patent
Uno

(10) Patent No.: US 12,753,811 B2
(45) Date of Patent: Oct. 6, 2026

(54) DISC BRAKE AND COVER COMPONENT

(71) Applicant: Hitachi Astemo, Ltd., Ibaraki (JP)

(72) Inventor: Miyuki Uno, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 475 days.

(21) Appl. No.: 18/281,696

(22) PCT Filed: Oct. 15, 2021

(86) PCT No.: PCT/JP2021/038322

§ 371 (c)(1),
(2) Date: Sep. 12, 2023

(87) PCT Pub. No.: WO2023/062843

PCT Pub. Date: Apr. 20, 2023

(65) Prior Publication Data

US 2024/0044378 A1 Feb. 8, 2024

(51) Int. Cl.
*F16D 65/00* (2006.01)
*F16D 55/226* (2006.01)
*F16D 55/00* (2006.01)

(52) U.S. Cl.
CPC ....... *F16D 65/0081* (2013.01); *F16D 55/226* (2013.01); *F16D 65/0056* (2013.01);
(Continued)

(58) Field of Classification Search
CPC ............... F16D 55/226; F16D 65/0056; F16D 65/0075; F16D 65/0081; F16D 2055/0037
See application file for complete search history.

(56) References Cited

U.S. PATENT DOCUMENTS

2022/0397170 A1* 12/2022 Becker ................ F16D 65/0081
2022/0397171 A1* 12/2022 Becker ................ F16D 65/0075
(Continued)

FOREIGN PATENT DOCUMENTS

DE 41 01 514 A1 7/1992
JP 2020-034043 A 3/2020
WO 2021/125052 A1 6/2021

OTHER PUBLICATIONS

International Search Report received in corresponding International Application No. PCT/JP2021/038322 dated Dec. 21, 2021.
(Continued)

*Primary Examiner* — Nicholas J Lane
(74) *Attorney, Agent, or Firm* — MATTINGLY & MALUR, PC

(57) ABSTRACT

This disc brake includes a first friction pad, a second friction pad, a piston, a caliper, a plate member, and an interlock member. The caliper has a cylinder portion, a bridge portion, a claw portion, and a recessed portion. The interlock member has a fixing portion which is fixed to the plate member, a first inward side folded interlock piece which extends in an axial direction of a cylinder hole from the fixing portion and in which a first inward side tip portion folded to an inward side of the cylinder hole in a radial direction abuts a groove, and a first outward side folded interlock piece which extends in the axial direction of the cylinder hole from the fixing portion and in which a first outward side tip portion folded an outward side of the cylinder hole in the radial direction abuts the groove.

12 Claims, 11 Drawing Sheets

(52) U.S. Cl.
CPC .. *F16D 65/0075* (2013.01); *F16D 2055/0008* (2013.01); *F16D 2055/002* (2013.01); *F16D 2055/0037* (2013.01)

(56) References Cited

U.S. PATENT DOCUMENTS

| | | | | |
|---|---|---|---|---|
| 2023/0025307 | A1 | 1/2023 | Lim et al. | |
| 2023/0034957 | A1* | 2/2023 | Zenzen ............... | F16D 65/0081 |
| 2024/0084863 | A1* | 3/2024 | Crippa ................ | F16D 65/0068 |

OTHER PUBLICATIONS

Written Opinion received in corresponding International Application No. PCT/JP2021/038322 dated Dec. 21, 2021.
Japanese Office Action received in corresponding Japanese Application No. 2023-182468 dated May 7, 2024.

* cited by examiner

DISC BRAKE AND COVER COMPONENT

TECHNICAL FIELD

The present invention relates to a disc brake and a cover component.

BACKGROUND ART

There is a disc brake having a cover component mounted in a part of a caliper that can be seen when viewed from the outside of a vehicle (for example, refer to Patent Document 1).

CITATION LIST

Patent Document

Patent Document 1

Specification of German Patent Application, Publication No. 4101514

SUMMARY OF INVENTION

Technical Problem

It is desired to improve adhesion of a cover component to a caliper and curb falling off of the cover component from the caliper.

An object of the present invention is to provide a disc brake and a cover component capable of improving adhesion of the cover component to a caliper and curbing falling off of the cover component from the caliper.

Solution to Problem

In order to achieve the foregoing object, a first aspect according to the present invention includes a caliper that accommodates a piston to be able to move in an axial direction of a disc and has a cylinder portion which has a cylinder hole accommodating the piston, a bridge portion which is provided in a manner of straddling an outer circumferential side of the disc from the cylinder portion, a claw portion which is provided in a manner of facing the cylinder portion in an axial direction of the cylinder hole from the bridge portion, and a recessed portion which is provided in the claw portion in a manner of facing the cylinder hole and has a groove on an inner circumferential surface; a plate member that covers the recessed portion in the axial direction of the cylinder hole; and an interlock member that fixes the plate member to the caliper and has a fixing portion which is fixed to the plate member, a first inward side folded interlock piece which extends in the axial direction of the cylinder hole from the fixing portion and in which a first inward side tip portion folded to an inward side of the cylinder hole in a radial direction abuts the groove, and a first outward side folded interlock piece which extends in the axial direction of the cylinder hole from the fixing portion and in which a first outward side tip portion folded to an outward side of the cylinder hole in the radial direction abuts the groove.

A second aspect according to the present invention is a cover component constituting a disc brake including a caliper that accommodates a piston to be able to move in an axial direction of a disc and has a cylinder portion which has a cylinder hole accommodating the piston, a bridge portion which is provided in a manner of straddling an outer circumferential side of the disc from the cylinder portion, a claw portion which is provided in a manner of facing the cylinder portion in an axial direction of the cylinder hole from the bridge portion, and a recessed portion which is provided in the claw portion in a manner of facing the cylinder hole and has a groove on an inner circumferential surface. The cover component includes a plate member that covers the recessed portion in the axial direction of the cylinder hole; and an interlock member that fixes the plate member to the caliper and has a fixing portion which is fixed to the plate member, a first inward side folded interlock piece which extends in the axial direction of the cylinder hole from the fixing portion and in which a first inward side tip portion folded to an inward side of the cylinder hole in a radial direction abuts the groove, and a first outward side folded interlock piece which extends in the axial direction of the cylinder hole from the fixing portion and in which a first outward side tip portion folded to an outward side of the cylinder hole in the radial direction abuts the groove.

Advantageous Effects of Invention

According to the present invention, it is possible to improve adhesion of a cover component to a caliper and curb falling off of the cover component from the caliper.

DESCRIPTION OF EMBODIMENT

An embodiment will be described below with reference to the drawings.

Figure 1:
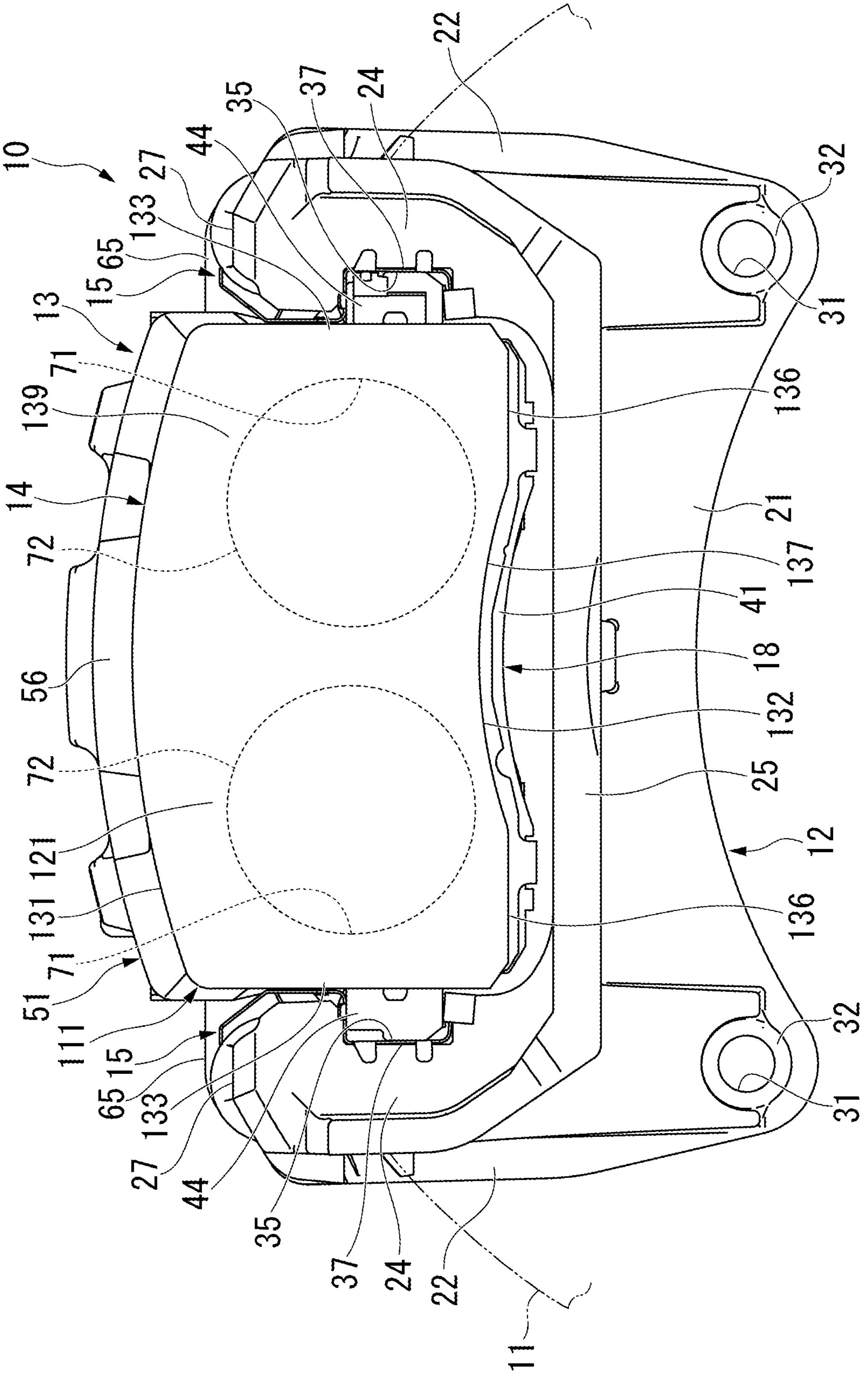
FIG. 1 is a front view illustrating a disc brake of an embodiment.
Figure 2:
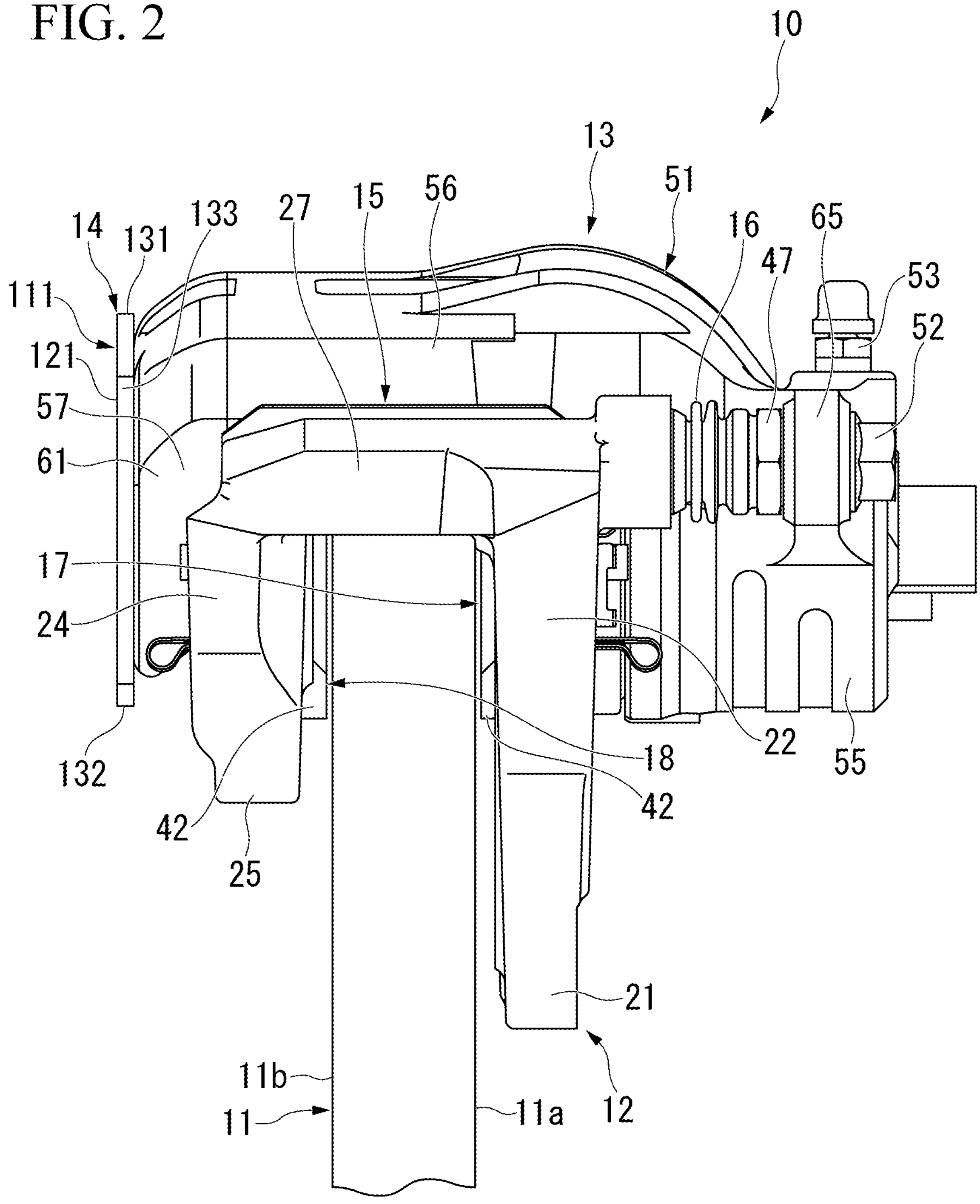
FIG. 2 is a side view illustrating the disc brake of the embodiment.

A disc brake 10 of the embodiment illustrated in FIGS. 1 and 2 is for a vehicle such as an automobile and applies a braking force to a vehicle. Specifically, it is for braking a front wheel of a four-wheeled automobile. The disc brake 10 brakes a vehicle by stopping rotation of a discoidal disc 11 which rotates together with a wheel (not illustrated).

As illustrated in FIG. 1, the disc brake 10 includes an attachment member 12, a caliper 13, a cover component 14, and a pair of pad springs 15 and includes a pair of boots 16 (only one of which is illustrated in FIG. 2). In addition, the disc brake 10 includes a pair of friction pads 17 (first friction pads) and friction pads 18 (second friction pads).

Hereinafter, a center axis of the disc 11 will be referred to as a disc axis, and an extending direction of the disc axis, that is, an axial direction of the disc 11 will be referred to as a disc axial direction. In addition, a radial direction of the disc 11 inside the disc brake 10 will be referred to as a disc radial direction, and a circumferential direction, namely, a rotation direction of the disc 11 inside the disc brake 10 will be referred to as a disc circumferential direction. A central side of the disc 11 in the disc radial direction will be referred to as an inward side in the disc radial direction, and a side opposite to the center of the disc 11 in the disc radial direction will be referred to as an outward side in the disc radial direction. In addition, a central side in the disc circumferential direction will be referred to as an inward side in the disc circumferential direction, and a side opposite to the center in the disc circumferential direction will be referred to as an outward side in the disc circumferential direction. In addition, a line passing through the disc axis and the center of the disc brake 10 in the disc circumferential direction and lying in the disc radial direction will be referred to as a radial reference line. This radial reference line is orthogonal to the disc axis. In addition, the outward side of a vehicle in a vehicle width direction where the disc brake is attached will be referred to as an outer side, and the inward side will be referred to as an inner side.

As illustrated in FIG. 1, the attachment member 12 has an inner beam portion 21, a pair of inner side pad support portions 22, a pair of outer side pad support portions 24, an outer beam portion 25, and a pair of pin insertion fitting portions 27. The attachment member 12 is a casting integrally formed by casting and has a mirror-symmetrical shape based on a plane including both the radial reference line and the disc axis.

As illustrated in FIG. 2, the inner beam portion 21 is disposed on one side in the disc axial direction with respect to the disc 11 and fixed to a non-rotation portion of the vehicle. Here, the non-rotation part of the vehicle having the inner beam portion 21 of the attachment member 12 fixed thereto is disposed on the inner side with respect to the disc 11, and the inner beam portion 21 attached to this non-rotation part is also disposed on the inner side with respect to the disc 11. As illustrated in FIG. 1, the inner beam portion 21 is disposed in a manner of extending in the disc circumferential direction, and a pair of attachment boss portions 32 respectively having attachment holes 31 are provided at both end parts on the outward side in the disc circumferential direction. The inner beam portion 21 is attached to the non-rotation part of the vehicle in the pair of attachment boss portions 32 by means of bolts (not illustrated) respectively screwed into the attachment holes 31.

In the pair of inner side pad support portions 22, one inner side pad support portion 22 extends from one end portion of the inner beam portion 21 on the outward side in the disc circumferential direction, and the other inner side pad support portion 22 extends from the other end portion of the inner beam portion 21 on the outward side in the disc circumferential direction respectively to the outward side in the disc radial direction. Similar to the inner beam portion 21, the pair of inner side pad support portions 22 (one of which is illustrated in FIG. 2) are disposed on the inner side with respect to the disc 11.

In the pair of pin insertion fitting portions 27 (one of which is illustrated in FIG. 2), one pin insertion fitting portion 27 extends in a manner of straddling an outer circumferential side of the disc 11 in the disc axial direction from an end portion of the inner side pad support portion 22 on the outward side in the disc radial direction on one side in the disc circumferential direction. In addition, the other pin insertion fitting portion 27 (illustrated in FIG. 1) of the pair of pin insertion fitting portions 27 extends in a manner of straddling the outer circumferential side of the disc 11 in the disc axial direction from an end portion of the inner side pad support portion 22 on the outward side in the disc radial direction on the other side in the disc circumferential direction.

In the pair of outer side pad support portions 24 (one of which is illustrated in FIG. 2), one outer side pad support portion 24 on one side in the disc circumferential direction extends to the inward side in the disc radial direction from a side of the pin insertion fitting portion 27 on one side in the disc circumferential direction opposite to the inner side pad support portion 22, that is, an end portion on the outer side. In addition, in the pair of outer side pad support portions 24, the other outer side pad support portion 24 (illustrated in FIG. 1) on the other side in the disc circumferential direction extends to the inward side in the disc radial direction from the end portion of the pin insertion fitting portion 27 on the outer side on the other side in the disc circumferential direction. The pair of outer side pad support portions 24 (one of which is illustrated in FIG. 2) are disposed on the outer side with respect to the disc 11.

As illustrated in FIG. 1, the outer beam portion 25 extends in the disc circumferential direction and couples the end portions of the pair of outer side pad support portions 24 on the inward side in the disc radial direction to each other. Similar to the pair of outer side pad support portions 24, the outer beam portion 25 is disposed on the outer side with respect to the disc 11.

As above, the attachment member 12 is provided in a manner of straddling the outer circumferential side of the disc 11 and fixed to the non-rotation part of the vehicle. The inner beam portion 21 and the pair of inner side pad support portions 22 are disposed on the inner side that becomes an attachment side with respect to the non-rotation part of the vehicle in the attachment member 12, and the pair of outer side pad support portions 24 and the outer beam portion 25 are disposed on the outer side that is opposite to the inner side in the attachment member 12.

In the pair of outer side pad support portions 24, pad guide portions 35 are respectively formed on sides facing each other. These pad guide portions 35 have shapes recessed in directions in which they are separated from each other in the disc circumferential direction. Although illustration is omitted, similar pad guide portions are also formed in the pair of inner side pad support portions 22.

One pad spring 15 of the pair of pad springs 15 is attached in a manner of straddling the inner side pad support portion 22 and the outer side pad support portion 24 on the same one side in the disc circumferential direction. This pad spring 15 has a recessed guide portion 37 fitted into the recessed pad guide portion 35 of the outer side pad support portion 24 on one side in the disc circumferential direction. In addition, although illustration is omitted, this pad spring 15 has a recessed guide portion fitted into the recessed pad guide portion of the inner side pad support portion 22 on the same one side in the disc circumferential direction.

The other pad spring 15 of the pair of pad springs 15 is attached in a manner of straddling the inner side pad support portion 22 and the outer side pad support portion 24 on the same the other side in the disc circumferential direction. This pad spring 15 has the recessed guide portion 37 fitted into the recessed pad guide portion 35 of the outer side pad support portion 24 on the other side in the disc circumferential direction. In addition, although illustration is omitted, this pad spring 15 has a recessed guide portion fitted into the recessed pad guide portion of the inner side pad support portion 22 on the same the other side in the disc circumferential direction.

The friction pad 17 and the friction pad 18 illustrated in FIG. 2 are common components. As in FIG. 1 illustrating one friction pad 18, each of the friction pads 17 and 18 has a rear plate 41, and the rear plate 41 has ear portions 44 respectively in both end portions on the outward side in the disc circumferential direction. As illustrated in FIG. 2, the friction pads 17 and 18 respectively have linings 42. The linings 42 are stuck on a surface of the corresponding rear plate 41 on one side in a thickness direction.

As illustrated in FIG. 1, in the friction pads 18 of the friction pads 17 and 18 disposed on the outer side, the ear portions 44 at both ends on the outward side in the disc circumferential direction are fitted into the respective pad guide portions 35 of the pair of outer side pad support portions 24 with the respective guide portions 37 of the pair of pad springs 15 therebetween. At this time, the pair of pad springs 15 elastically support these friction pads 18. In this manner, the friction pads 18 on the outer side are supported to be able to move in the disc axial direction by the pair of outer side pad support portions 24 of the attachment member 12 with the pair of pad springs 15 therebetween.

In the friction pads 17 (illustrated in FIG. 2) of the friction pads 17 and 18 disposed on the inner side, ear portions (not illustrated) at both ends on the outward side in the disc circumferential direction are fitted into the respective pad guide portions (not illustrated) of the pair of inner side pad support portions 22 with the respective guide portions (not illustrated) of the pair of pad springs 15 therebetween. At this time, the pair of pad springs 15 elastically support these friction pads 17. In this manner, the friction pads 17 on the inner side are supported to be able to move in the disc axial direction by the pair of inner side pad support portions 22 of the attachment member 12 with the pair of pad springs 15 therebetween.

Both the friction pads 17 and 18 face the disc 11 in the linings 42. Thus, in both the friction pads 17 and 18, the linings 42 come into contact with the disc 11. The pair of friction pads 17 and 18 supported by the attachment member 12 with the pair of pad springs 15 therebetween are pressurized against the disc 11 by the caliper 13.

The friction pads 17 on the inner side are movably provided in the attachment member 12 and disposed in a manner of facing one surface 11*a* on the inner side of surfaces 11*a* and 11*b* on both sides of the disc 11 in the disc axial direction. The friction pads 18 on the outer side are movably provided in the attachment member 12 and disposed in a manner of facing the other surface 11*b* on the outer side of the surfaces 11*a* and 11*b* on both sides of the disc 11 in the disc axial direction.

In the attachment member 12, pin insertion holes (not illustrated) extending in the disc axial direction are respectively formed in the pair of pin insertion fitting portions 27 on both sides in the disc circumferential direction (illustrated in FIG. 1), and a pair of slide pins 47 (only one of which is illustrated in FIG. 2) on both sides of the caliper 13 in the disc circumferential direction are slidably fitted into these pin insertion holes. Accordingly, the attachment member 12 slidably supports the caliper 13 in the disc axial direction in the pair of pin insertion fitting portions 27. In other words, in the caliper 13, the pair of slide pins 47 provided on both sides in the disc circumferential direction are slidably fitted into the pin insertion holes (not illustrated) of the pair of pin insertion fitting portions 27 of the attachment member 12, respectively. Accordingly, it is supported by the attachment member 12 to be able to move in the disc axial direction. The pair of boots 16 respectively cover the slide pins 47 protruding from the pin insertion fitting portions 27.

The caliper 13 has a caliper body 51, the pair of slide pins 47 (only one of which is illustrated in FIG. 2), a pair of pin attachment bolts 52 (only one of which is illustrated in FIG. 2), and a bleeder plug 53. The caliper 13 has a mirror-symmetrical shape based on a plane including both the radial reference line and the disc axis except for constitutions related to the bleeder plug 53.

The caliper body 51 is integrally formed by casting. The caliper body 51 has a cylinder portion 55, a bridge portion 56, and a claw portion 57. In other words, the caliper 13 including the caliper body 51 has the cylinder portion 55, the bridge portion 56, and the claw portion 57.

The cylinder portion 55 is disposed on the inner side in the disc axial direction with respect to the disc 11. The bridge portion 56 extends to the outer side in the disc axial direction from the outward side of the cylinder portion 55 in the disc radial direction. In other words, the bridge portion 56 is provided in a manner of straddling the outer circumferential side of the disc 11 from the cylinder portion 55. The claw portion 57 extends to the inward side in the disc radial direction from a side opposite to the cylinder portion 55 in the disc axial direction of the bridge portion 56 and disposed on the outer side in the disc axial direction with respect to the disc 11.

Figure 3:
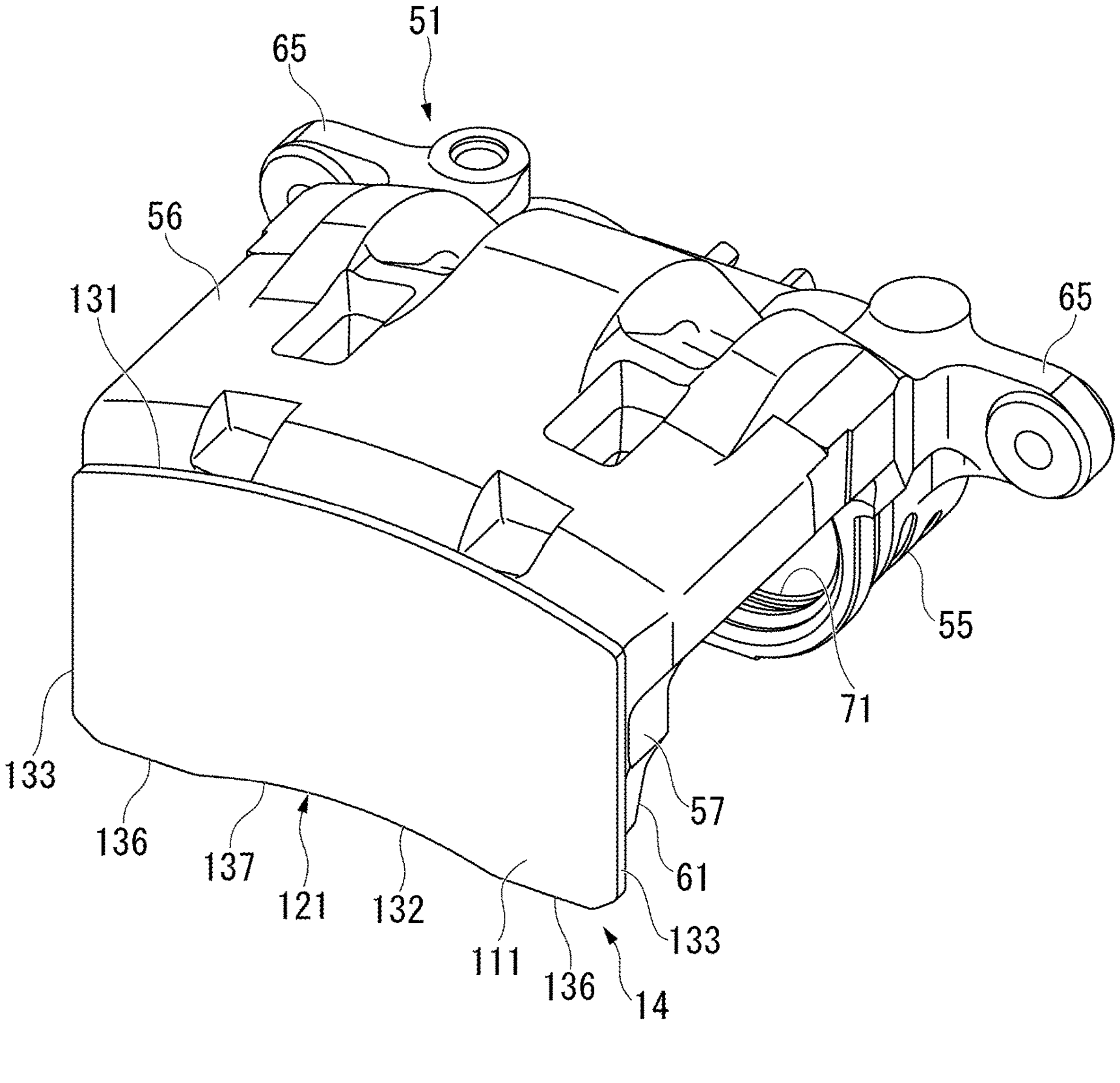
FIG. 3 is a perspective view illustrating a caliper body and a cover component of the disc brake of the embodiment.

As illustrated in FIG. 3, the caliper body 51 has a pair of pin attachment portions extending to both sides in the disc circumferential direction from the cylinder portion One slide pin 47 is attached to one pin attachment portion 65 of the pair of pin attachment portions 65 (one of which is illustrated in FIG. 2) by means of one pin attachment bolt 52, and the other slide pin (not illustrated) is attached to the other pin attachment portion 65 of the pair of pin attachment portions 65 by means of the other pin attachment bolt (not illustrated).

A pair of cylinder holes 71 (one of which is illustrated in FIG. 3) are formed in the cylinder portion 55. Both the pair of cylinder holes 71 have a shape of which one end opens toward the claw portion 57 side and which is recessed toward a side opposite to the claw portion 57 in the disc axial direction. In other words, both the pair of cylinder holes 71 are recessed toward a side opposite to the disc 11 in the cylinder portion 55. Both the pair of cylinder holes 71 lie in the disc axial direction. The pair of cylinder holes 71 have the same shape and are provided in the cylinder portion 55 side by side in the disc circumferential direction as illustrated in FIG. 1 with their positions aligned in the disc axial direction and the disc radial direction and with their positions shifted in the disc circumferential direction. The caliper 13 is a so-called twin bore caliper having two cylinder holes 71.

The cylinder holes 71 are disposed such that pistons 72 can move in the disc axial direction. In other words, the cylinder portion 55 has the cylinder holes 71 accommodating the pistons 72. The caliper 13 accommodates the pistons 72 to be able to move in the disc axial direction.

As illustrated in FIG. 3, the claw portion 57 is provided in a manner of facing the cylinder portion 55 is the axial direction of the cylinder holes 71 from the bridge portion 56. The claw portion 57 is at a position overlapping the cylinder portion 55 in the radial direction of the cylinder holes 71.

As illustrated in FIG. 2, the friction pads 18 on the outer side of the friction pads 17 and 18 are supported by the attachment member 12 and disposed between the claw portion 57 and the disc 11. In addition, the friction pads 17 on the inner side of the friction pads 17 and 18 are supported by the attachment member 12 and disposed between the cylinder portion 55 and the pistons 72 (illustrated in FIG. 1) provided in the cylinder portion 55, and the disc 11. The pistons 72 face the friction pads 17 on the inner side of the friction pads 17 and 18 in the disc axial direction and pressurize these friction pads 17.

Figure 4:
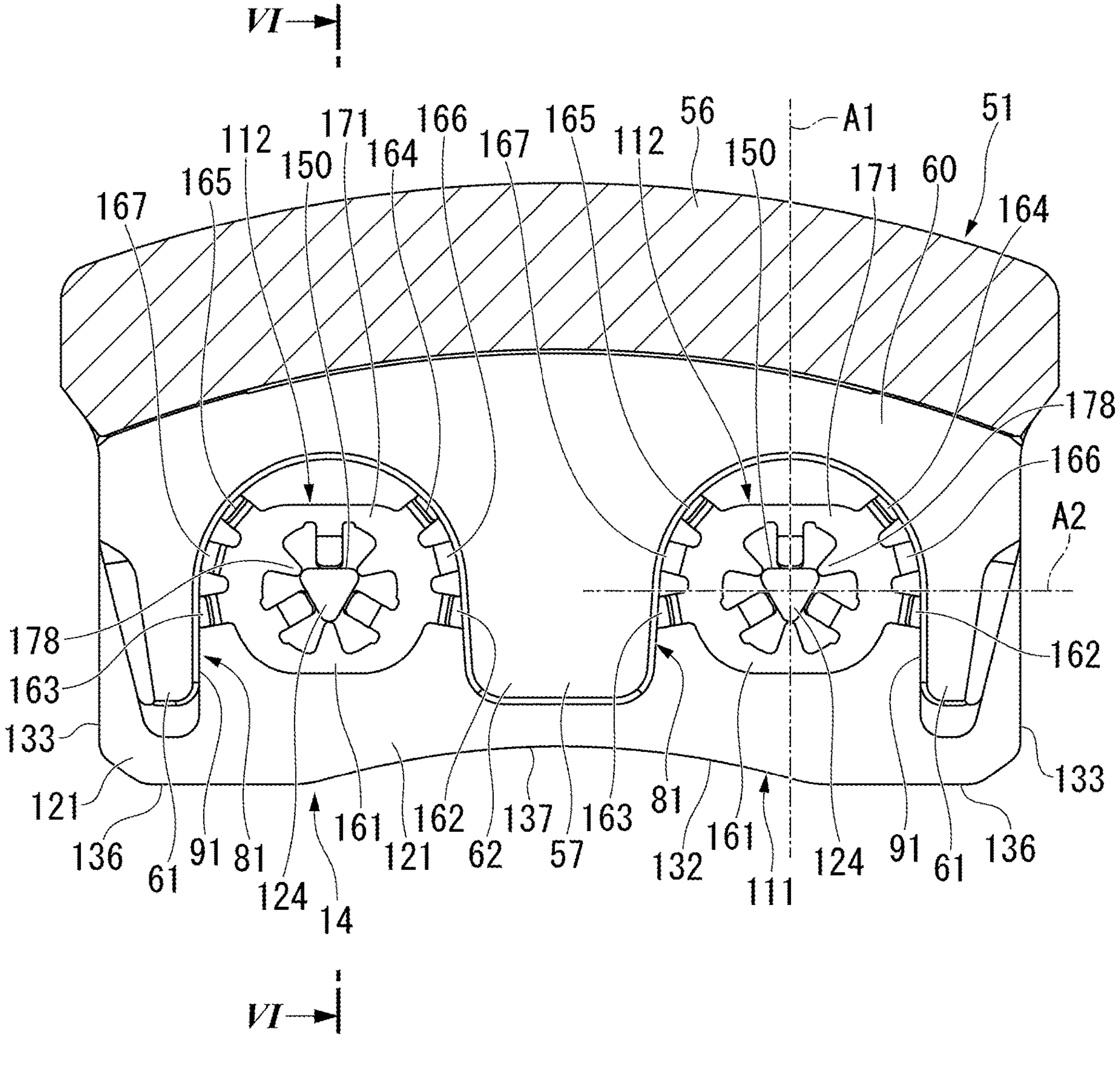
FIG. 4 is a rear view in which a bridge portion of the caliper body of the disc brake of the embodiment is cut away to allow a claw portion and the cover component to be seen.
Figure 5:
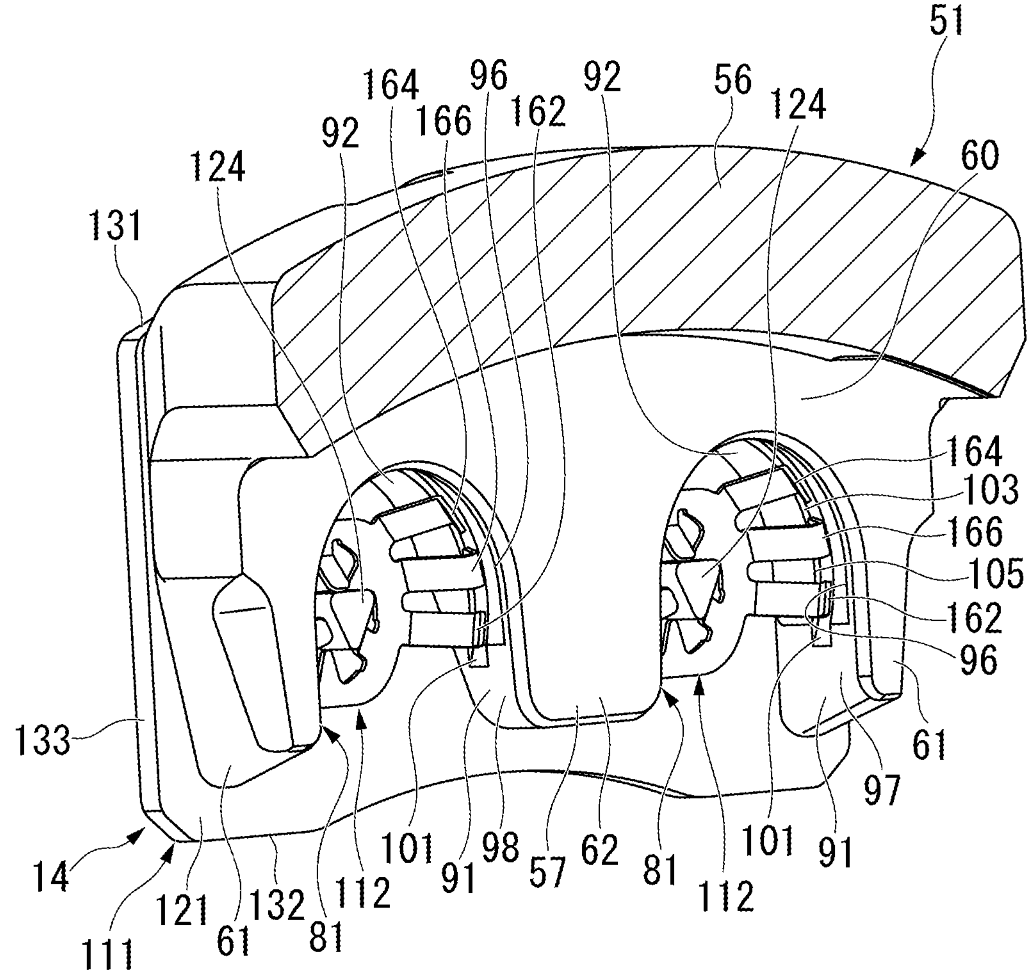
FIG. 5 is a perspective view in which the bridge portion of the caliper body of the disc brake of the embodiment is cut away to allow the claw portion and the cover component to be seen.

As illustrated in FIGS. 4 and 5, the claw portion 57 has a proximal portion 60 on the bridge portion 56 side, a pair of outward side claws 61 on a side opposite to the bridge portion 56 and in both end portions on the outward side in the disc circumferential direction, and an intermediate claw 62 on a side opposite to the bridge portion 56 and between the pair of outward side claws 61. All the proximal portion 60, the pair of outward side claws 61, and the intermediate claw 62 are on a side opposite to the cylinder portion 55 in the disc axial direction of the bridge portion 56, extend to the inward side in the disc radial direction from the bridge portion 56, and are positioned on the outer side in the disc axial direction with respect to the disc 11. In other words, all the proximal portion 60, the pair of outward side claws 61, and the intermediate claw 62 are disposed on a tip side of the bridge portion 56 in the extending direction from the cylinder portion Both the pair of outward side claws 61 and the intermediate claw 62 are at positions overlapping the cylinder portion 55 in the disc circumferential direction and the disc radial direction and disposed in a manner of facing the cylinder portion 55 in the disc axial direction. A width of each of the pair of outward side claws 61 in the disc circumferential direction is narrower than that of the intermediate claw 62.

The outward side claws 61 and the intermediate claw 62 are disposed away from each other in the disc circumferential direction. Accordingly, in the claw portion 57, parts between the outward side claws 61 and the intermediate claw 62 adjacent to each other in the disc circumferential direction become recessed portions 81 having a shape penetrating the claw portion 57 in the disc axial direction and opening inward in the disc radial direction. In other words, the recessed portions 81 are provided between the outward side claws 61 and the intermediate claw 62 and have a shape recessed toward the outward side in the disc radial direction from an end portion of the claw portion 57 on the inward side in the disc radial direction. Further, in other words, the recessed portions 81 have an open end portion on the inward side in the disc radial direction.

Since the claw portion 57 has three claws, specifically, the pair of outward side claws 61 and the intermediate claw 62, two recessed portions 81 are provided. In the caliper body 51, the recessed portions 81 are formed in a manner of respectively facing the pair of cylinder holes 71. That is, the caliper body 51 is provided with the recessed portions 81 as many as the number of cylinder holes 71.

One recessed portion 81 of the two recessed portions 81 is provided between one outward side claw 61 of the pair of outward side claws 61 and the intermediate claw 62 and faces one cylinder hole 71 of the two cylinder holes 71 in the disc axial direction at a position overlapping it in the disc circumferential direction and the disc radial direction. The one recessed portion 81 is a part through which a tool for machining the inside of the one facing cylinder hole 71 is inserted.

In addition, the other recessed portion 81 of the two recessed portions 81 is provided between the other outward side claw 61 of the pair of outward side claws 61 and the intermediate claw 62 and faces the other cylinder hole 71 of the two cylinder holes 71 in the disc axial direction at a position overlapping it in the disc circumferential direction and the disc radial direction. The other recessed portion 81 is a part through which a tool for machining the inside of the other facing cylinder hole 71 is inserted.

In other words, in the claw portion 57, one recessed portion 81 is provided in a manner of facing one cylinder hole 71, and the other recessed portion 81 is provided in a manner of facing the other cylinder hole 71. The caliper body 51, that is, the caliper 13 including the caliper body 51 has the pair of recessed portions 81.

These recessed portions 81 have a mirror-symmetrical shape based on a plane including both the radial reference line and the disc axis. These recessed portions 81 are provided side by side in the disc circumferential direction with their positions aligned in the disc axial direction and the disc radial direction and with their positions shifted in the disc circumferential direction. Since the two recessed portions 81 have a mirror-symmetrical shape, one recessed portion 81 will be described herein as an example.

Figure 6:
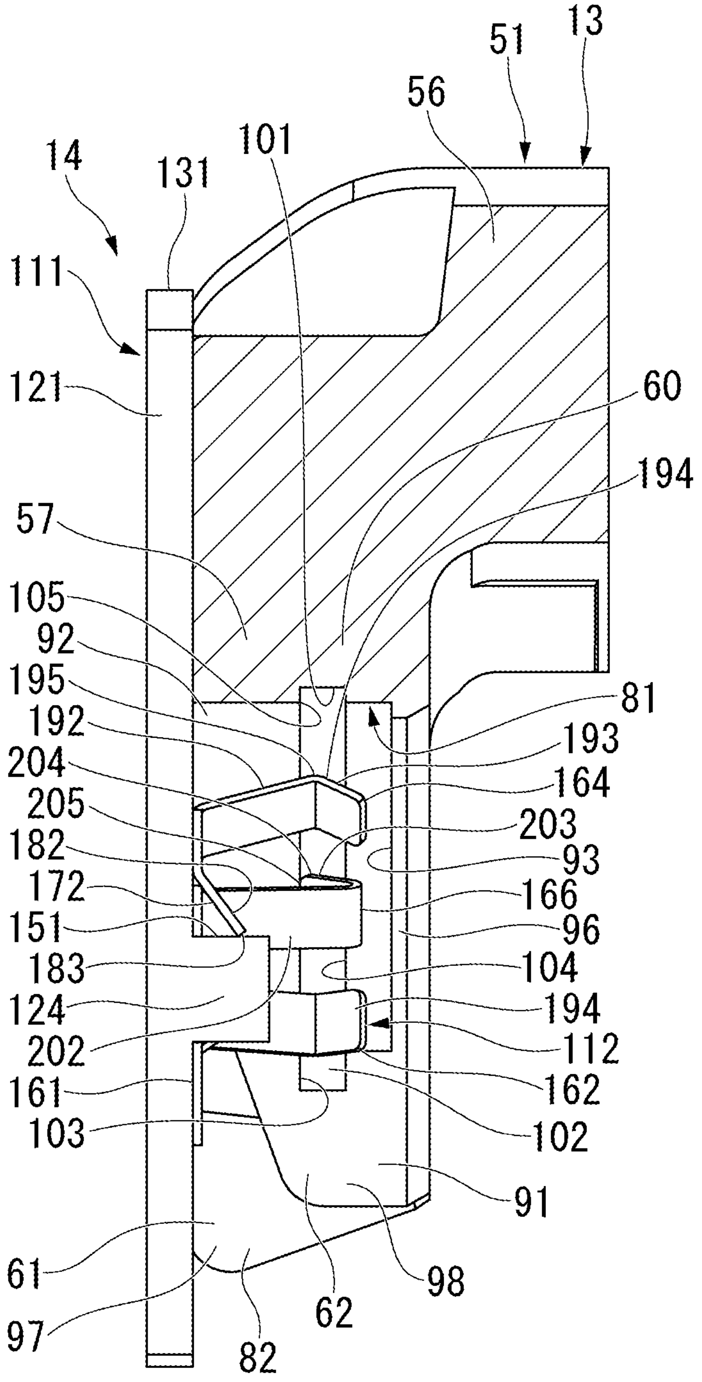
FIG. 6 is a cross-sectional view along VI-VI indicated in FIG. 4 in which the bridge portion of the caliper body of the disc brake of the embodiment is cut away to allow the claw portion and the cover component to be seen.

As illustrated in FIG. 6, an inner circumferential surface 91 of the recessed portion 81 has a main surface portion 92 and a stepped surface portion 93. The main surface portion 92 has a cylindrical surface shape and is formed to open to a side opposite to (the left side in FIG. 6) the cylinder portion 55 from an intermediate portion in the disc axial direction on the inner circumferential surface 91. The stepped surface portion 93 has a flat surface shape extending inward in the radial direction of the main surface portion 92 from an end edge portion of the main surface portion 92 on the cylinder portion 55 side (the right side in FIG. 6) in the disc axial direction. The main surface portion 92 is a cylindrical surface coaxial with the center axis of the cylinder hole 71 illustrated in FIG. 3. In other words, the main surface portion 92 is a cylindrical surface lying in the disc axial direction. The stepped surface portion 93 is a flat surface orthogonal to the center axis of the cylinder hole 71. As illustrated in FIG. 5, the main surface portion 92 is longer than half the cylindrical surface in the circumferential direction. In other words, a central angle of the main surface portion 92 exceeds 180°.

As illustrated in FIG. 6, the inner circumferential surface 91 of the recessed portion 81 has a rear side surface portion 96, an end side surface portion 97, and an intermediate side surface portion 98. The rear side surface portion 96 is on the cylinder portion 55 side (the right side in FIG. 6) in the disc axial direction from the stepped surface portion 93 and has substantially a cylindrical surface shape. As illustrated in FIG. 5, the end side surface portion 97 has substantially a flat surface shape extending to the inward side in the disc radial direction from the outward side claw 61 side of the main surface portion 92 and the end edge portion on the inward side in the disc radial direction. The intermediate side surface portion 98 has substantially a flat surface shape extending to the inward side in the disc radial direction from the intermediate claw 62 side of the main surface portion 92 and the end edge portion on the inward side in the disc radial direction.

The rear side surface portion 96 is substantially a cylindrical surface coaxial with the center axis of the cylinder hole 71. The end side surface portion 97 and the intermediate side surface portion 98 lie along the center axis of the cylinder hole 71 are almost parallel to a plane including both the radial reference line and the disc axis. The main surface portion 92 is recessed from the rear side surface portion 96 toward the outward side thereof in the radial direction. In addition, the main surface portion 92 is recessed outward in the disc circumferential direction from the end side surface portion 97 and recessed inward in the disc circumferential direction from the intermediate side surface portion 98.

The inner circumferential surface 91 of the recessed portion 81 has a groove 101 recessed outward in the radial direction of the main surface portion 92 from an intermediate portion of the main surface portion 92 in the disc axial direction. In other words, the recessed portion 81 has the groove 101 on the inner circumferential surface 91. The groove 101 lies along the inner circumferential surface 91 of the recessed portion 81 and has an arc shape in its entirety. The groove 101 has an arc shape concentric with the main surface portion 92. The groove 101 is formed throughout the main surface portion 92 in its entirety in the circumferential direction, and both ends thereof in the circumferential direction are at positions overlapping the end side surface portion 97 and the intermediate side surface portion 98 in the circumferential direction. In other words, in the groove 101, the intermediate portion in the circumferential direction is formed throughout the main surface portion 92 in its entirety in the circumferential direction, and both end portions in the circumferential direction are dented to the end side surface portion 97 side and the intermediate side surface portion 98 side beyond the main surface portion 92. Similar to the main surface portion 92, the central angle of the groove 101 also exceeds 180°.

As illustrated in FIG. 6, the groove 101 has a groove bottom surface 102 and a pair of wall surfaces 103 and 104. The groove bottom surface 102 has a cylindrical surface shape coaxial with the main surface portion 92. The central angle of the groove bottom surface 102 also exceeds 180°. The pair of wall surfaces 103 and 104 have a flat surface shape rising inward in the radial direction of the groove bottom surface 102 from both end edge portions of the groove bottom surface 102 in the disc axial direction. Both the pair of wall surfaces 103 and 104 also have a flat surface shape extending in a manner of being orthogonal to the center axis of the groove bottom surface 102. In other words, both the pair of wall surfaces 103 and 104 have a flat surface shape extending in a manner of being orthogonal to the center axis of the main surface portion 92. The main surface portion 92 side of the wall surface 103 of the pair of wall surfaces 103 and 104 on a side opposite to (the left side in FIG. 6) the cylinder portion 55, in other words, an end edge portion 105 of the wall surface 103 on the inward side in the radial direction has an arc shape. The central angle of the end edge portion 105 also exceeds 180°.

Here, the rear side surface portion 96, the end side surface portion 97, and the intermediate side surface portion 98 can be casting surfaces that are cast at the time of casting of the caliper body 51. In contrast, the main surface portion 92, the stepped surface portion 93, and the groove bottom surface 102 and the pair of wall surfaces 103 and 104 of the groove 101 are cut surfaces formed in the caliper body 51 by cutting after casting.

The main surface portion 92 is recessed in the disc circumferential direction beyond the end side surface portion 97 and recessed in the disc circumferential direction beyond the intermediate side surface portion 98. In the groove 101, a gap between both end portions on a side opposite to the bridge portion 56 is smaller than the diameter. That is, in the groove 101, a gap between both end portions of the groove bottom surface 102 in the circumferential direction on a side opposite to the bridge portion 56 is smaller than the diameter of the groove bottom surface 102.

As illustrated in FIGS. 4 to 6, the cover component 14 has a plate member 111 and interlock members 112 that are members different from this plate member 111. Two interlock members 112, which is the same number as the number of recessed portions 81, are provided.

Figure 7:
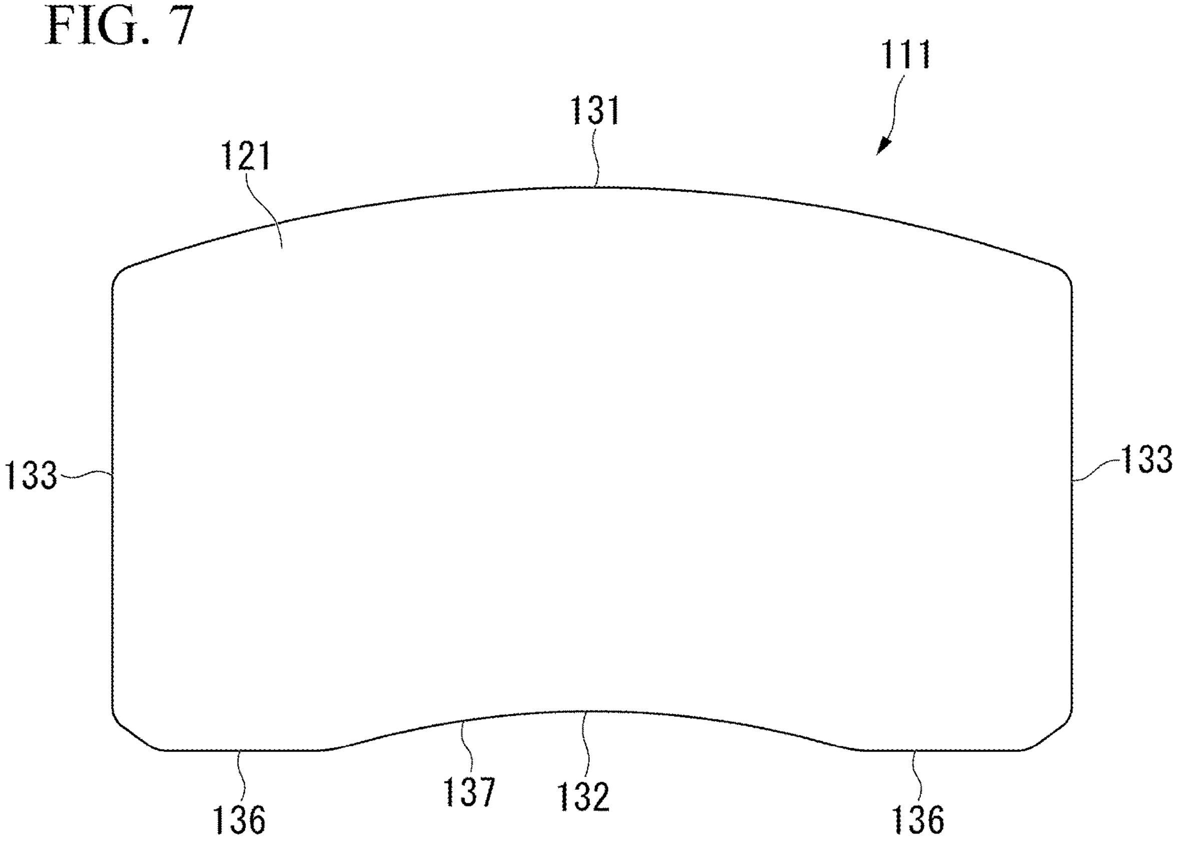
FIG. 7 is a front view illustrating a plate member of the disc brake of the embodiment.
Figure 8:
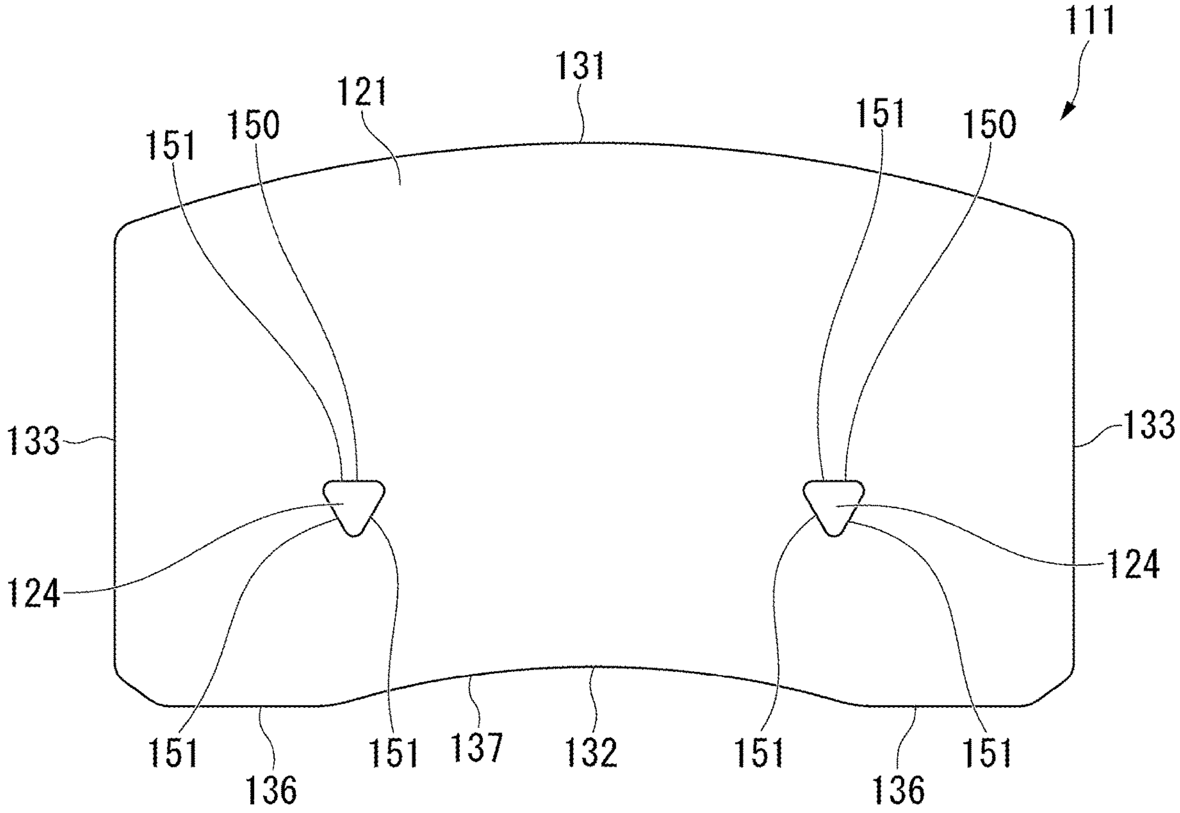
FIG. 8 is a rear view illustrating the plate member of the disc brake of the embodiment.
Figure 9:
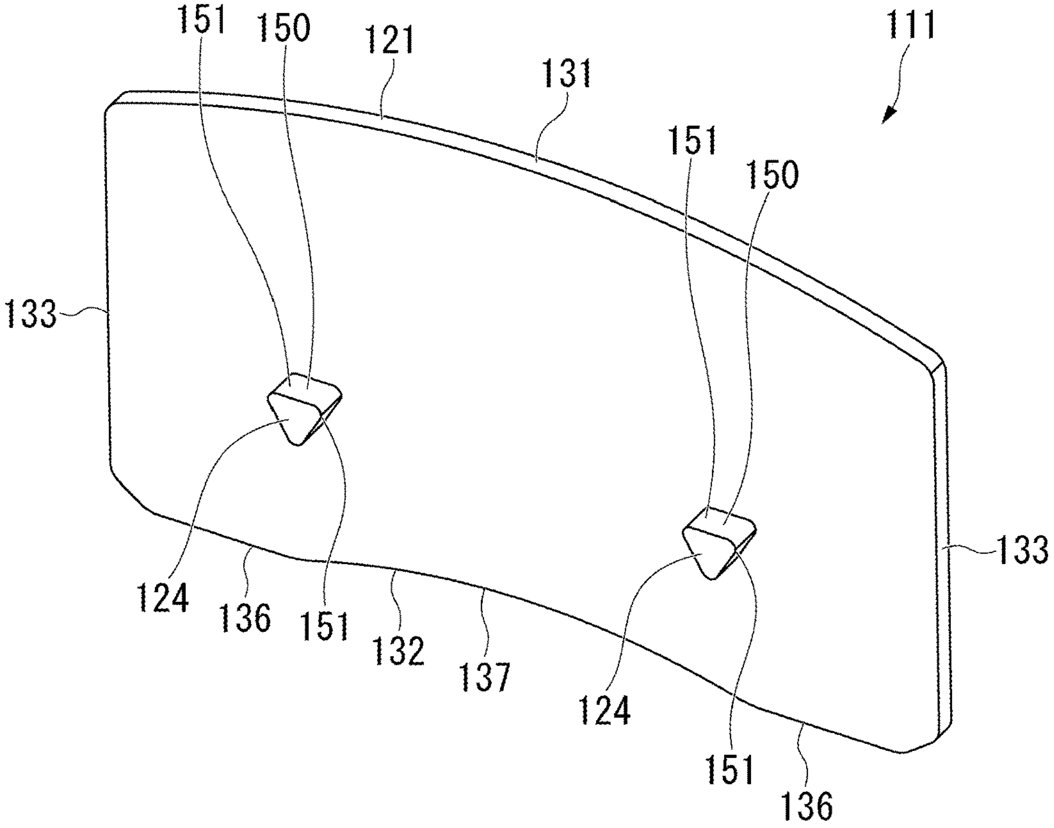
FIG. 9 is a perspective view illustrating the plate member of the disc brake of the embodiment.
Figure 10:
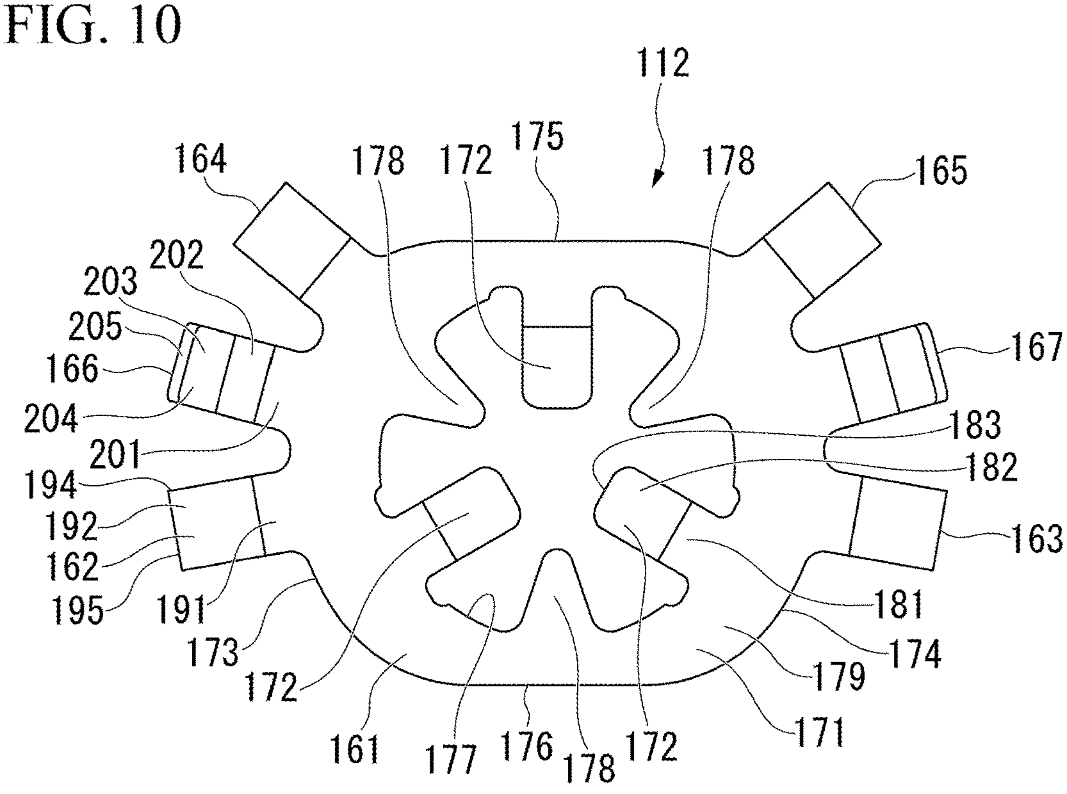
FIG. 10 is a front view illustrating an interlock member of the disc brake of the embodiment.
Figure 11:
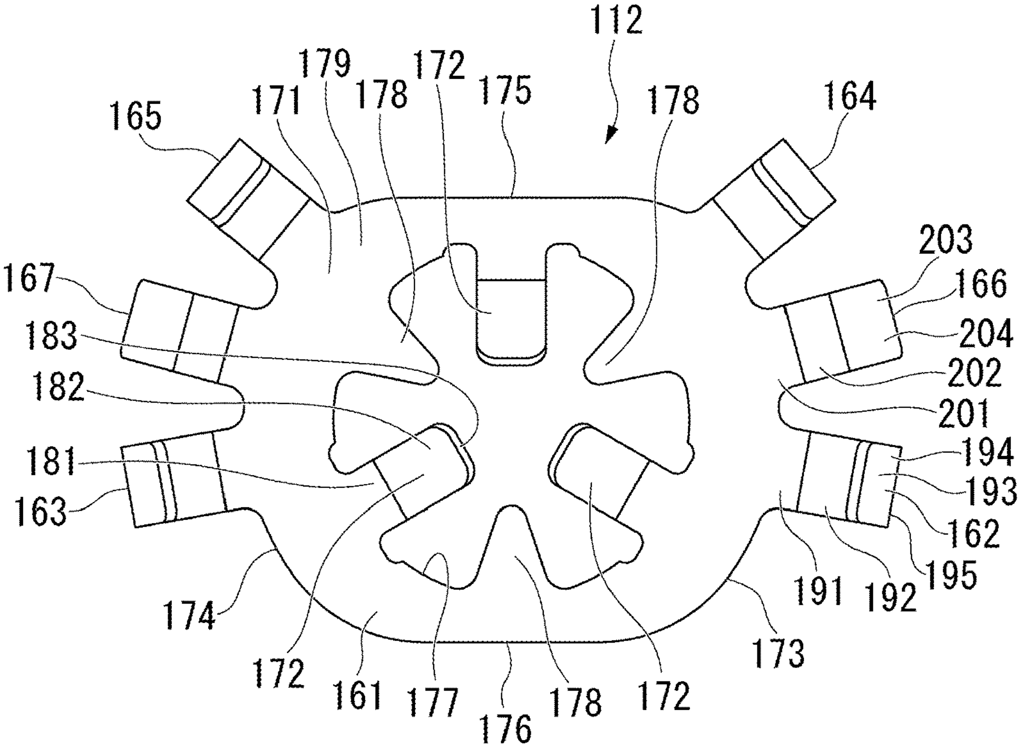
FIG. 11 is a rear view illustrating the interlock member of the disc brake of the embodiment.
Figure 12:
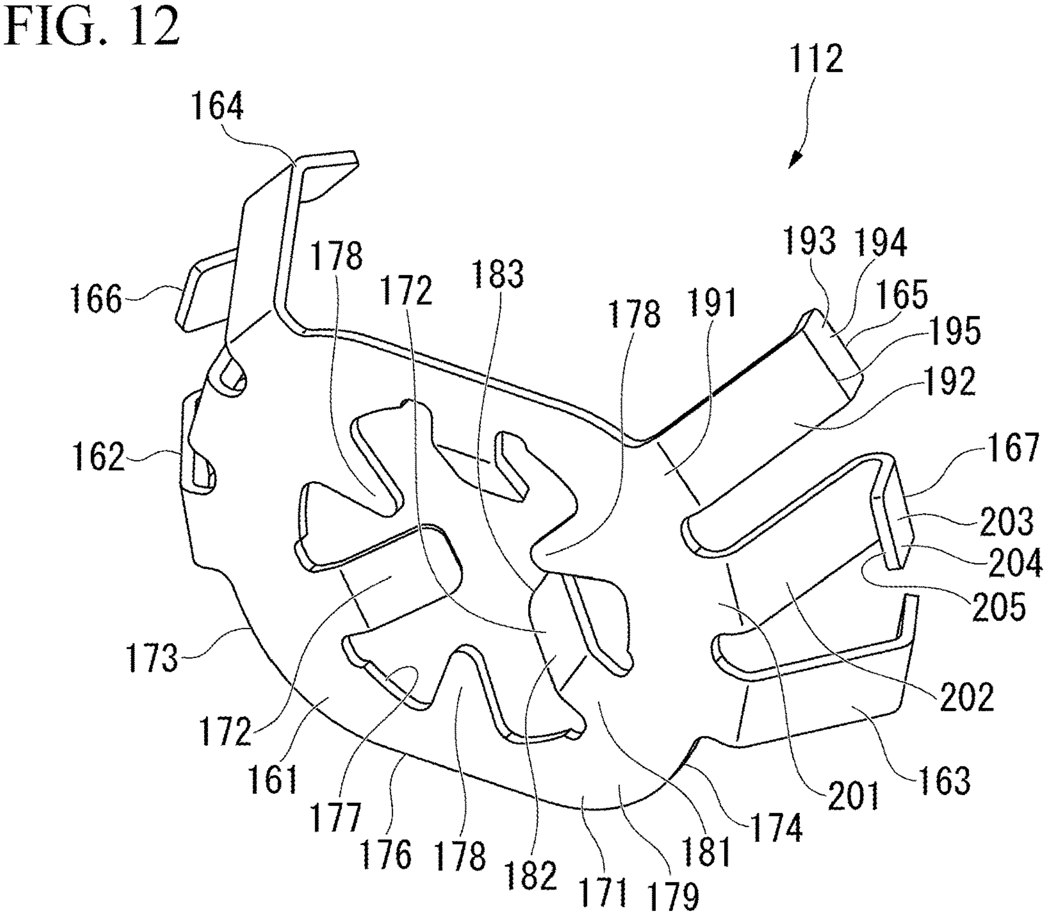
FIG. 12 is a perspective view illustrating the interlock member of the disc brake of the embodiment.
Figure 13:
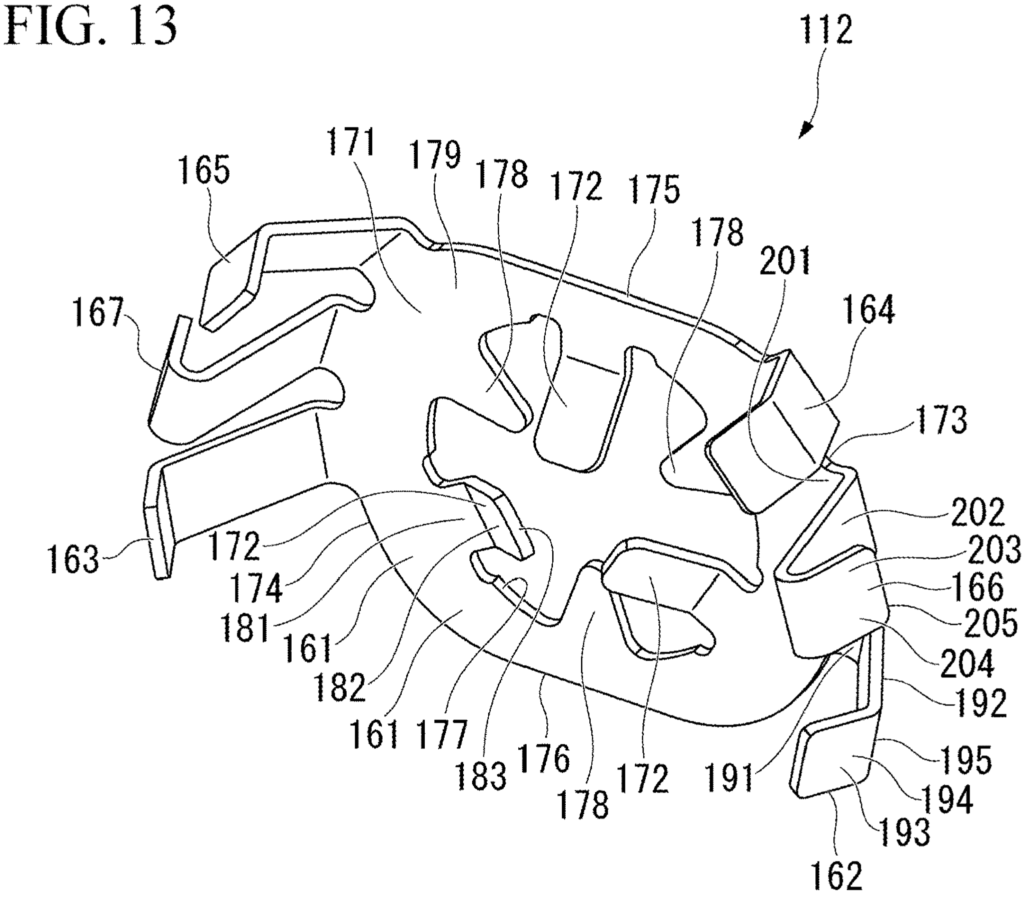
FIG. 13 is a perspective view illustrating the interlock member of the disc brake of the embodiment.

The plate member 111 has the shape illustrated in FIGS. 7 to 9. For example, the plate member 111 is an integrally formed product made of a metal such as an aluminum alloy and has a mirror-symmetrical shape. The plate member 111 has a main plate portion 121 and a pair of protruding portions 124. The plate member 111 is not limited to being made of a metal such as an aluminum alloy and may be integrally formed using a material such as a synthetic resin.

The main plate portion 121 has substantially a rectangular plate shape and has a long side edge portion 131, a long side edge portion 132, and a pair of short side edge portions 133 in an outer circumferential portion. The long side edge portion 131 on one side entirely has an arc shape protruding toward the outward side of the main plate portion 121. In addition, the long side edge portion 132 on the other side has a pair of straight line-shaped end side edge portions 136 disposed on the same straight line, and an arc-shaped intermediate edge portion 137 located between these and recessed toward the inward side of the main plate portion 121. The pair of short side edge portions 133 of the main plate portion 121 have a straight line shape and connect the long side edge portion 131 and the long side edge portion 132 to each other. The pair of short side edge portions 133 are parallel to each other. The main plate portion 121 has a flat plate shape with a certain thickness.

As illustrated in FIGS. 8 and 9, the pair of protruding portions 124 rise on the same side of the main plate portion 121 in the thickness direction vertically from the main plate portion 121. Distances from the pair of protruding portions 124 to the pair of end side edge portions 136 are equivalent to each other.

The pair of protruding portions 124 have an equilateral triangular prism shape in which each outer circumferential surface 150 has three side surfaces 151. Each of the pair of protruding portions 124 is formed such that one side surface 151 is parallel to the end side edge portions 136 and directed opposite to the end side edge portions 136 and a corner portion between the two remaining side surfaces 151 points at the long side edge portion 132.

Each of the pair of protruding portions 124 may be formed such that one side surface 151 is parallel to the end side edge portions 136 and located on the same side as the end side edge portions 136 and a corner portion between the two remaining side surfaces 151 points at the long side edge portion 131.

In the pair of protruding portions 124, one protruding portion 124 is disposed close to one short side edge portion 133 of the pair of short side edge portions 133, and the other protruding portion 124 is disposed close to the other short side edge portion 133. A distance between one protruding portion 124 and one short side edge portion 133 close to this is equivalent to a distance between the other protruding portion 124 and the other short side edge portion 133 close to this. A distance between the centers of the pair of protruding portions 124 is set to be equivalent to a distance between the centers of the main surface portion 92 of the pair of recessed portions 81 illustrated in FIG. 5.

The interlock members 112 have the shape illustrated in FIGS. 10 to 13. The interlock members 112 are integrally formed products formed of a spring steel plate by press forming and have a mirror-symmetrical shape. The interlock members 112 each have a fixing portion 161, an inward side folded interlock piece 162, an inward side folded interlock piece 163, an inward side folded interlock piece 164, an inward side folded interlock piece 165, an outward side folded interlock piece 166, and an outward side folded interlock piece 167.

The fixing portion 161 has a substrate portion 171 and a plurality of, specifically, three fixing pieces 172. The substrate portion 171 has a perforated flat plate shape with a certain thickness and has a pair of arc-shaped edge portion 173 and arc-shaped edge portion 174 both of which have an arc shape, a straight line-shaped edge portion 175 having a straight line shape, and a straight line-shaped edge portion 176 having a straight line shape in the outer circumferential portion. The arc-shaped edge portion 173 and the arc-shaped edge portion 174 have a mirror-symmetrical shape and have a shape expanding in directions opposite to each other. The straight line-shaped edge portion 175 and the straight line-shaped edge portion 176 are parallel to each other. The straight line-shaped edge portion 175 and the straight line-shaped edge portion 176 connect the arc-shaped edge portion 173 and the arc-shaped edge portion 174 to each other.

In the substrate portion 171, an inner circumferential edge portion 177 has a circular shape and has a plurality of guide interlock pieces 178 protruding inward in the radial direction thereof from the inner circumferential edge portion 177. Three guide interlock pieces 178, which is the same number as that of corner portions of the triangular prism-shaped protruding portions 124 of the plate member 111 on the outer circumferential side, are provided. The three guide interlock pieces 178 have the same shape, which is substantially a triangular shape. The three guide interlock pieces 178 may not be substantially a triangular shape as long as they have a shape in point contact or line contact with the protruding portions 124. All the three guide interlock pieces 178 have a shape in which a vertex is directed toward the center of a circle formed by the inner circumferential edge portion 177. The three guide interlock pieces 178 are disposed at equal intervals in the circumferential direction of the circle formed by the inner circumferential edge portion 177 and disposed at intervals of 120°. A vertex portion of each of the three guide interlock pieces 178 on a protruding tip side is disposed at each angular position of an equilateral triangle centering on the center of the circle formed by the inner circumferential edge portion 177. The positional relationship between the vertex portions of the three guide interlock pieces 178 is equivalent to the positional relationship between three corner portions of the triangular prism-shaped protruding portions 124 of the plate member 111 on the outer circumferential side.

One guide interlock piece 178 of the three guide interlock pieces 178 is disposed on a line connecting the center of the circle formed by the inner circumferential edge portion 177 and the center of the straight line-shaped edge portion 176 in a length direction. This guide interlock piece 178 is disposed at a position closest to the straight line-shaped edge portion 176 in the inner circumferential edge portion 177 and disposed at a position farthest from the straight line-shaped edge portion 175. Two remaining guide interlock pieces 178 of the three guide interlock pieces 178 are disposed at positions at equal distances from the straight line-shaped edge portion 176 and also disposed at positions at equal distances from the straight line-shaped edge portion 175.

A part of the substrate portion 171 excluding the three guide interlock pieces 178 is an annular main body portion 179. The main body portion 179 has the arc-shaped edge portion 173, the arc-shaped edge portion 174, the straight line-shaped edge portion 175, the straight line-shaped edge portion 176, and the inner circumferential edge portion 177. The three guide interlock pieces 178 protrude inward in the radial direction of the main body portion 179 from the main body portion 179.

In the fixing portion 161, three fixing pieces 172, which is the same number as that of the side surfaces 151 of the protruding portion 124, are provided. The three fixing pieces 172 protrude inward in the radial direction thereof from the inner circumferential edge portion 177 of the substrate portion 171. The three fixing pieces 172 have the same shape. All the three fixing pieces 172 have a shape directed toward the center of the circle formed by the inner circumferential edge portion 177 when viewed in the thickness direction of the substrate portion 171. The three fixing pieces 172 and the three guide interlock pieces 178 are alternately disposed in the circumferential direction of the inner circumferential edge portion 177 one by one. The three fixing pieces 172 are disposed at equal intervals in the circumferential direction of the inner circumferential edge portion 177 and disposed at intervals of 120°. Each of the three fixing pieces 172 is disposed at a position at equal distances with respect to two guide interlock pieces 178 on both sides of the inner circumferential edge portion 177 in the circumferential direction. In the three fixing pieces 172 and the three guide interlock pieces 178, one fixing piece 172 and one guide interlock piece 178 face each other in the radial direction of the inner circumferential edge portion 177.

One fixing piece 172 of the three fixing pieces 172 is disposed on a line connecting the center of the circle formed by the inner circumferential edge portion 177 of the substrate portion 171 and the center of the straight line-shaped edge portion 175 in the length direction. This fixing piece 172 is disposed at a position farthest from the straight line-shaped edge portion 176 in the inner circumferential edge portion 177 and disposed at a position closest to the straight line-shaped edge portion 175. Two remaining fixing pieces 172 of the three fixing pieces 172 are disposed at positions at equal distances from the straight line-shaped edge portion 176 and also disposed at positions at equal distances the straight line-shaped edge portion 175.

Each of the three fixing pieces 172 has an inward side proximal plate portion 181 and a fixing plate portion 182. The inward side proximal plate portion 181 has a flat plate shape and extends inward in the radial direction of the inner circumferential edge portion 177 from the inner circumferential edge portion 177 of the substrate portion 171 with the same flat surface shape as the substrate portion 171. The fixing plate portion 182 has a flat plate shape and extends inward in the radial direction of the inner circumferential edge portion 177 from the end edge portion of the adjacent inward side proximal plate portion 181 on the extending tip side while being inclined with respect to the substrate portion 171. The fixing plate portion 182 is inclined in a manner of being away from the substrate portion 171 in the thickness direction of the substrate portion 171 as it extends from the adjacent inward side proximal plate portion 181. A tip edge portion 183 of the fixing plate portion 182 on a side opposite to the adjacent inward side proximal plate portion 181 has a straight line shape parallel to the substrate portion 171.

The three fixing pieces 172 extend to the same side with respect to the substrate portion 171 in the thickness direction thereof. The three tip edge portions 183 of the three fixing pieces 172 are disposed in a manner of forming respective sides of an equilateral triangle. The equilateral triangle formed by the three tip edge portions 183 is smaller than the equilateral triangle formed by the three side surfaces 151 of the protruding portion 124 by the amount of interference.

In the fixing portion 161 having the foregoing shape, the center of the circle formed by the inner circumferential edge portion 177 becomes a center portion thereof. The three fixing pieces 172 and the three guide interlock pieces 178 are provided on the central side of the fixing portion 161.

As described above, the interlock member 112 is provided with the inward side folded interlock piece 162, the inward side folded interlock piece 163, the inward side folded interlock piece 164, the inward side folded interlock piece 165, the outward side folded interlock piece 166, and the outward side folded interlock piece 167. The inward side folded interlock pieces 162 to 165 have the same shape. The outward side folded interlock pieces 166 and 167 have the same shape and have a shape different from those of the inward side folded interlock pieces 162 to 165.

The interlock member 112 is provided with one or more inward side folded interlock pieces having the same shape, specifically, provided with four inward side folded interlock pieces 162 to 165. The interlock member 112 is provided with one or more outward side folded interlock pieces having the same shape, specifically, provided with two outward side folded interlock pieces 166 and 167. The interlock member 112 is provided with two or more interlock pieces, specifically, provided with six interlock pieces 162 to 167.

The inward side folded interlock piece 162, the inward side folded interlock piece 164, and the outward side folded interlock piece 166 extend from the arc-shaped edge portion 173 of the fixing portion 161. The inward side folded interlock piece 163, the inward side folded interlock piece 165, and the outward side folded interlock piece 167 extend from the arc-shaped edge portion 174 of the fixing portion 161. The straight line-shaped edge portions 175 and 176 are provided with no interlock piece. The inward side folded interlock piece 162 and the inward side folded interlock piece 163 are disposed in a mirror-symmetrical shape. The inward side folded interlock piece 164 and the inward side folded interlock piece 165 are disposed in a mirror-symmetrical shape. The outward side folded interlock piece 166 and the outward side folded interlock piece 167 are disposed in a mirror-symmetrical shape.

The inward side folded interlock piece 162 and the inward side folded interlock piece 163 are disposed on the straight line-shaped edge portion 176 side beyond a line passing through the center of the circle formed by the inner circumferential edge portion 177 of the substrate portion 171 and parallel to the straight line-shaped edge portions 175 and 176. The outward side folded interlock piece 166 and the outward side folded interlock piece 167 are disposed on the straight line-shaped edge portion 175 side beyond a line passing through the center of the circle formed by the inner circumferential edge portion 177 of the substrate portion 171 and parallel to the straight line-shaped edge portions 175 and 176. The inward side folded interlock piece 164 and the inward side folded interlock piece 165 are disposed closer to the straight line-shaped edge portion 175 side than the outward side folded interlock piece 166 and the outward side folded interlock piece 167.

The outward side folded interlock piece 166 is disposed between the inward side folded interlock piece 162 and the inward side folded interlock piece 164 in the circumferential direction of the inner circumferential edge portion 177 of the substrate portion 171. The interval between the outward side folded interlock piece 166 and the inward side folded interlock piece 162 is equivalent to the interval between the outward side folded interlock piece 166 and the inward side folded interlock piece 164. The outward side folded interlock piece 167 is disposed between the inward side folded interlock piece 163 and the inward side folded interlock piece 165 in the circumferential direction of the inner circumferential edge portion 177 of the substrate portion 171. The interval between the outward side folded interlock piece 167 and the inward side folded interlock piece 163 is equivalent to the interval between the outward side folded interlock piece 167 and the inward side folded interlock piece 165. The inward side folded interlock pieces 162 to 165 and the outward side folded interlock pieces 166 and 167 extend to the same side in the thickness direction of the substrate portion 171 from the substrate portion 171.

Each of the inward side folded interlock pieces 162 to 165 has an outward side proximal portion 191, an intermediate portion 192, and a tip portion 193. In each of the inward side folded interlock pieces 162 to 165, a part of the intermediate portion 192 adjacent to the tip portion 193 side and this tip portion 193 constitute an inward side tip portion 194. The outward side proximal portion 191 of each of the inward side folded interlock pieces 162 to 165 has a flat plate shape and is disposed in the same flat surface shape as the substrate portion 171. The outward side proximal portion 191 of each of the inward side folded interlock pieces 162 and 164 extends outward in the radial direction of the arc-shaped edge portion 173 from the arc-shaped edge portion 173. The outward side proximal portion 191 of each of the inward side folded interlock pieces 163 and 165 extends outward in the radial direction of the arc-shaped edge portion 174 from the arc-shaped edge portion 174.

The intermediate portion 192 of each of the inward side folded interlock pieces 162 to 165 has a flat plate shape. Each intermediate portion 192 extends to one side in the thickness direction of the substrate portion 171 from the end edge portion of the adjacent outward side proximal portion 191 on the extending tip side. The intermediate portion 192 of each of the inward side folded interlock pieces 162 and 164 is inclined in a manner of being positioned on the outward side of the arc-shaped edge portion 173 in the radial direction as it goes away from the substrate portion 171 in the thickness direction of the substrate portion 171. The intermediate portion 192 of each of the inward side folded interlock pieces 163 and 165 is inclined in a manner of being positioned on the outward side of the arc-shaped edge portion 174 in the radial direction as it goes away from the substrate portion 171 in the thickness direction of the substrate portion 171. Here, in the inward side folded interlock pieces 162 to 165, all the intermediate portions 192 are inclined at an equivalent angle with respect to the adjacent outward side proximal portion 191. Thus, in the inward side folded interlock pieces 162 to 165, all the intermediate portions 192 in their entirety have a shape of which the diameter increases as it goes away from the substrate portion 171 in the thickness direction of the substrate portion 171. The angle formed by the intermediate portion 192 and the adjacent outward side proximal portion 191 is an angle larger than 90° and smaller than 135°.

The tip portion 193 of each of the inward side folded interlock pieces 162 to 165 has a flat plate shape. Each tip portion 193 extends to a side opposite to the substrate portion 171 in the thickness direction of the substrate portion 171 from the end edge portion of the adjacent intermediate portion 192 on a side opposite to the outward side proximal portion 191 adjacent thereto. The tip portion 193 of each of the inward side folded interlock pieces 162 and 164 is inclined in a manner of being positioned on the inward side in the radial direction of the arc-shaped edge portion 173 as it goes away from the substrate portion 171 in the thickness direction of the substrate portion 171. The tip portion 193 of each of the inward side folded interlock pieces 163 and 165 is inclined in a manner of being positioned on the inward side in the radial direction of the arc-shaped edge portion 174 as it goes away from the substrate portion 171 in the thickness direction of the substrate portion 171.

Here, in the inward side folded interlock pieces 162 to 165, each tip portion 193 forms an equivalent angle with the adjacent intermediate portion 192. Thus, in the inward side folded interlock pieces 162 to 165, all the tip portions 193 in their entirety have a shape of which the diameter decreases as they go away from the substrate portion 171 in the thickness direction of the substrate portion 171. The angle formed by the tip portion 193 and the adjacent intermediate portion 192 is an obtuse angle.

In the inward side folded interlock pieces 162 to 165, a part of each intermediate portion 192 on a side opposite to the substrate portion 171 and the tip portion 193 adjacent to this part constitute the inward side tip portion 194 folded to the substrate portion 171 side in a direction in which the substrate portion 171 extends. In the inward side folded interlock pieces 162 to 165, a boundary portion 195 on the projecting side between each intermediate portion 192 and the tip portion 193 adjacent thereto has a straight line shape. All the boundary portions 195 of the inward side folded interlock pieces 162 to 165 are disposed such that a tangential line is formed with respect to the same circle. In all the boundary portions 195 of the inward side folded interlock pieces 162 to 165, both end portions thereof in the extending direction are all disposed on the same circle. The center of this circle is disposed on the center axis of the circle formed by the inner circumferential edge portion 177. The diameter of the circle passing through both end portions of all the boundary portions 195 is larger than the diameter of the end edge portion 105 of the groove 101 of the recessed portion 81, in other words, is larger than the diameter of the main surface portion 92. In addition, edge portions of extending tips of all the tip portions 193 of the inward side folded interlock pieces 162 to 165 are disposed such that a tangential line is formed with respect to the same circle.

Each of the outward side folded interlock pieces 166 and 167 has an outward side proximal portion 201, an intermediate portion 202, and a tip portion 203. In each of the outward side folded interlock pieces 166 and 167, a part of the intermediate portion 202 on the tip portion 203 side adjacent thereto and this tip portion 203 constitute an outward side tip portion 204. The outward side proximal portion 201 of each of the outward side folded interlock pieces 166 and 167 has a flat plate shape and is disposed in the same flat surface shape as the substrate portion 171. In the outward side folded interlock piece 166, the outward side proximal portion 201 thereof extends outward in the radial direction of the arc-shaped edge portion 173 from the arc-shaped edge portion 173. In the outward side folded interlock piece 167, the outward side proximal portion 201 thereof extends outward in the radial direction of the arc-shaped edge portion 174 from the arc-shaped edge portion 174.

The intermediate portion 202 of each of the outward side folded interlock pieces 166 and 167 has a flat plate shape. Each intermediate portion 202 extends to one side in the thickness direction of the substrate portion 171 from the end edge portion of the adjacent outward side proximal portion 201 on the extending tip side. The intermediate portion 202 of the outward side folded interlock piece 166 is inclined in a manner of being positioned on the outward side of the arc-shaped edge portion 173 in the radial direction as it goes away from the substrate portion 171 in the thickness direction of the substrate portion 171. The intermediate portion 202 of the outward side folded interlock piece 167 is inclined in a manner of being positioned on the outward side of the arc-shaped edge portion 174 in the radial direction as it goes away from the substrate portion 171 in the thickness direction of the substrate portion 171.

Here, in the outward side folded interlock pieces 166 and 167, each intermediate portion 202 is inclined at an equivalent angle with respect to the adjacent outward side proximal portion 201. Thus, in the outward side folded interlock pieces 166 and 167, each intermediate portion 202 in its entirety has a shape of which the diameter increases as it goes away from the substrate portion 171 in the thickness direction of the substrate portion 171. The angle formed by the intermediate portion 202 of each of the outward side folded interlock pieces 166 and 167 and the adjacent outward side proximal portion 201 is an obtuse angle, which is smaller than the angle formed by the intermediate portion 192 of each of the inward side folded interlock pieces 162 to 165 and the adjacent outward side proximal portion 191.

The tip portion 203 of each of the outward side folded interlock pieces 166 and 167 has a flat plate shape. The tip portion 203 of the outward side folded interlock piece 166 extends to the outward side of the arc-shaped edge portion 173 in the radial direction and the substrate portion 171 side in the thickness direction of the substrate portion 171 from the end edge portion of the adjacent intermediate portion 202 on a side opposite to the outward side proximal portion 201 adjacent thereto. The tip portion 203 of the outward side folded interlock piece 167 extends to the outward side of the arc-shaped edge portion 174 in the radial direction and the substrate portion 171 side in the thickness direction of the substrate portion 171 from the end edge portion of the adjacent intermediate portion 202 on a side opposite to the outward side proximal portion 201 adjacent thereto.

The tip portion 203 of the outward side folded interlock piece 166 is inclined in a manner of being positioned on the outward side in the radial direction of the arc-shaped edge portion 173 as it approaches the substrate portion 171 in the thickness direction of the substrate portion 171. The tip portion 203 of the outward side folded interlock piece 167 is inclined in a manner of being positioned on the outward side in the radial direction of the arc-shaped edge portion 174 as it approaches the substrate portion 171 in the thickness direction of the substrate portion 171.

Here, in the outward side folded interlock pieces 166 and 167, each tip portion 203 forms an equivalent angle with the adjacent intermediate portion 202. Thus, in the outward side folded interlock pieces 166 and 167, the tip portions 203 of both of them in their entirety have a shape of which the diameter increases as they approach the substrate portion 171 in the thickness direction of the substrate portion 171. The angle formed by the tip portion 203 of each of the outward side folded interlock pieces 166 and 167 and the adjacent intermediate portion 202 is an acute angle.

In the outward side folded interlock pieces 166 and 167, a part of each intermediate portion 202 on a side opposite to the substrate portion 171 and the tip portion 203 adjacent to this part constitute the outward side tip portion 204 folded to a side opposite to the substrate portion 171 in a direction in which the substrate portion 171 extends. In the outward side folded interlock pieces 166 and 167, a tip edge portion 205 of each tip portion 203 on a side opposite to the adjacent intermediate portion 202 has a straight line shape. The tip edge portion 205 of each of the outward side folded interlock pieces 166 and 167 is disposed such that a tangential line is formed with respect to the same circle. In all the tip edge portions 205 of the outward side folded interlock pieces 166 and 167, both end portions thereof in the extending direction are all disposed on the same circle. The center of this circle is disposed on the center axis of the circle formed by the inner circumferential edge portion 177. The diameter of the circle passing through both end portions of all the tip edge portions 205 of the outward side folded interlock pieces 166 and 167 is larger than the diameter of the end edge portion 105 of the groove 101 of the recessed portion 81, in other words, is larger than the diameter of the main surface portion 92.

Figure 14:
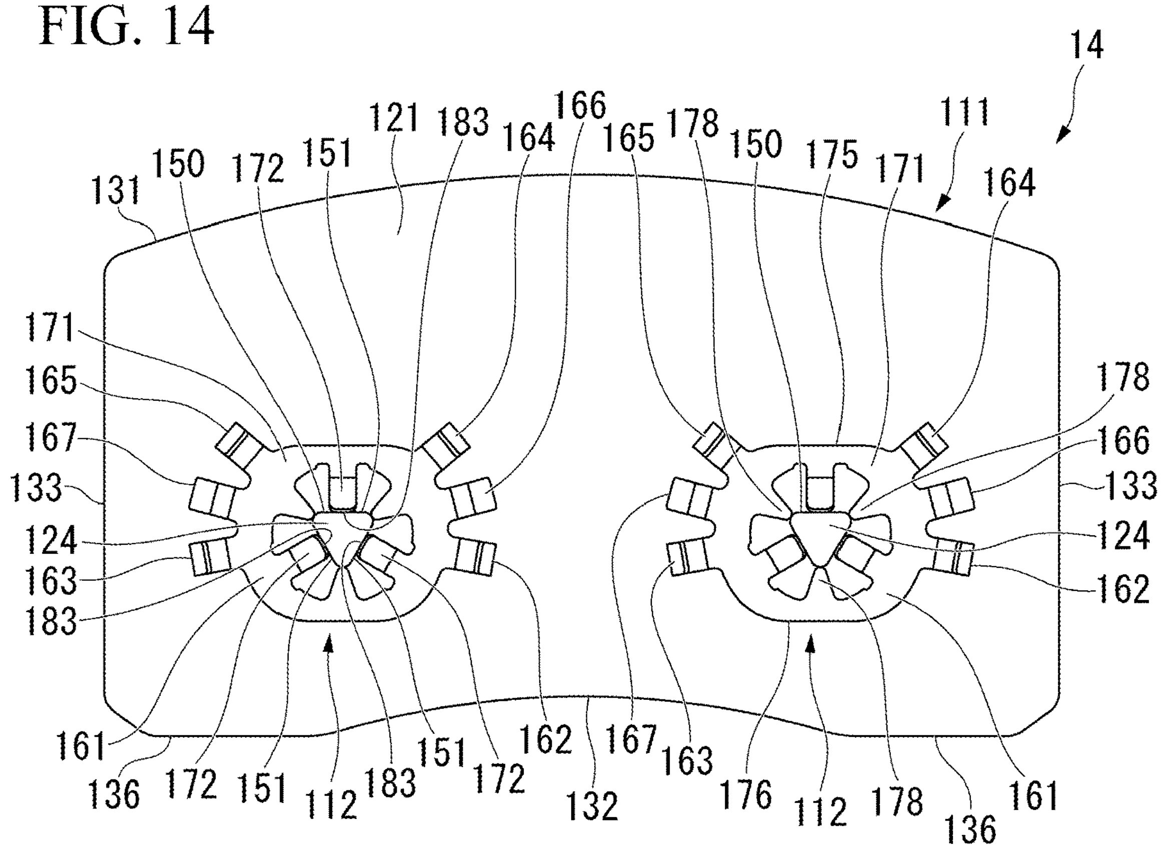
FIG. 14 is a rear view illustrating the cover component of the disc brake of the embodiment.
Figure 15:
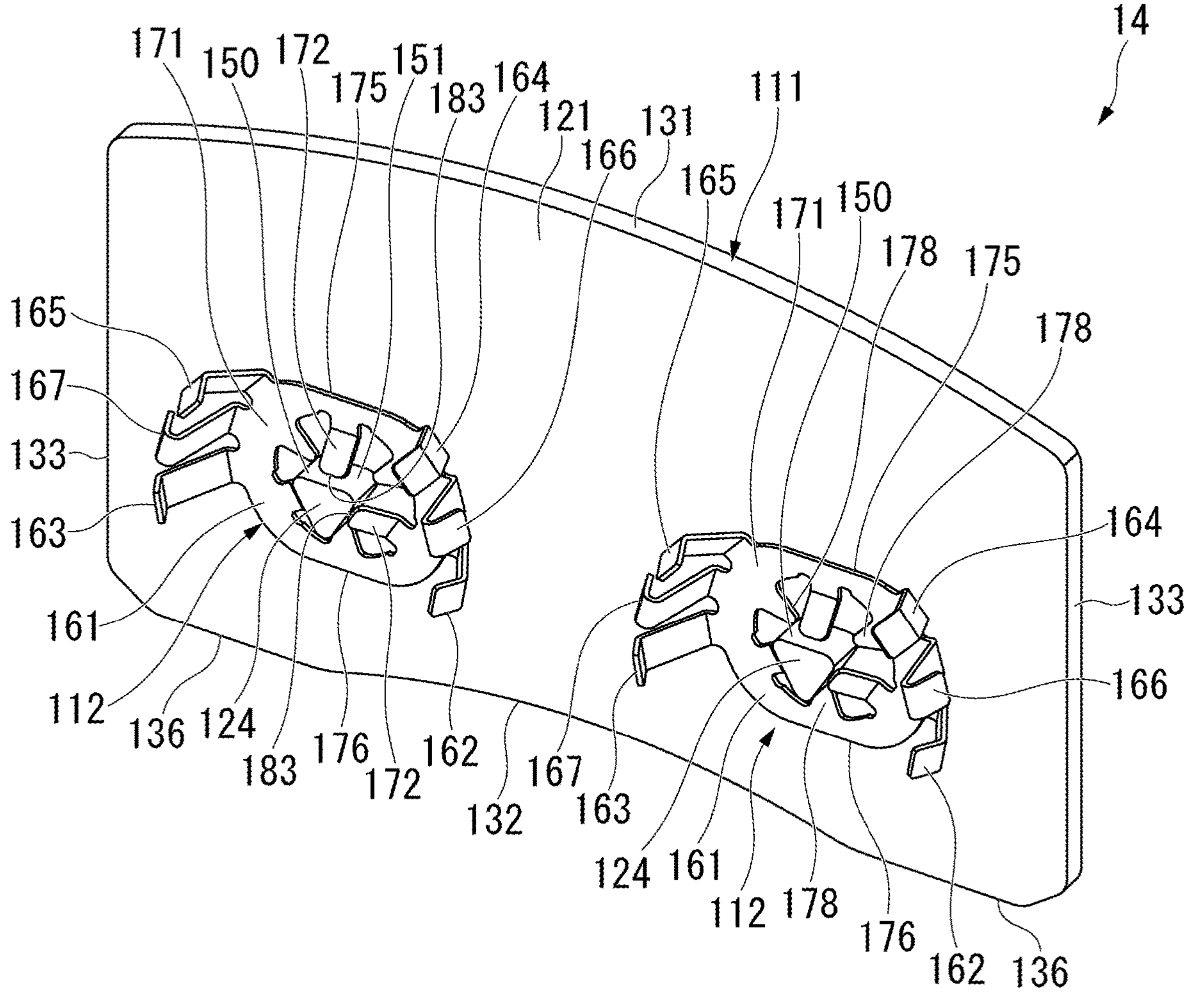
FIG. 15 is a perspective view illustrating the cover component of the disc brake of the embodiment.

As illustrated in FIGS. 14 and 15, the pair of interlock members 112 are fitted and fixed to the pair of protruding portions 124 of the plate member 111, thereby forming the cover component 14. That is, one interlock member 112 of the pair of interlock members 112 is fitted into one protruding portion 124 while elastically deforming the three fixing pieces 172 of the fixing portion 161. At this time, the one interlock member 112 is in a posture in which the substrate portion 171 is in the front in a fitting direction, the straight line-shaped edge portion 175 is disposed on the long side edge portion 131 side of the long side edge portion 131 and the long side edge portion 132 of the plate member 111, the straight line-shaped edge portion 176 is disposed on the long side edge portion 132 side of the long side edge portion 131 and the long side edge portion 132, and the straight line-shaped edge portions 175 and 176 are parallel to the end side edge portions 136 of the long side edge portion 132. In addition, at this time, in the one interlock member 112, in the three fixing pieces 172, each of the tip edge portions 183 is brought into line contact with the corresponding one of the three side surfaces 151 of one protruding portion 124, and the three guide interlock pieces 178 are guided and move to three corner portions of the outer circumferential surface 150 of the protruding portion 124 at three vertex portions. Further, in the one interlock member 112, the substrate portion 171 is fitted into one protruding portion 124 until it abuts the main plate portion 121. Consequently, in the one interlock member 112, each of the three tip edge portions 183 abuts corresponding one of the three side surfaces 151 of one protruding portion 124 in a line contact manner and is interlocked and fixed to the plate member 111 due to elastic forces of the three fixing pieces 172. Accordingly, the one interlock member 112 is fixed to the plate member 111 in a state in which the substrate portion 171 abuts the main plate portion 121.

In addition, the other interlock member 112 of the pair of interlock members 112 is fitted into the other protruding portion 124 in a manner similar to that above while elastically deforming the three fixing pieces 172 of the fixing portion 161. Accordingly, it is fixed to the plate member 111.

In this manner, the pair of interlock members 112 are fixed to the plate member 111, thereby forming the cover component 14. In this state, the two interlock member 112 are disposed in a longitudinal direction of the plate member 111. The pair of interlock members 112 are fixed to the plate member 111 in the respective fixing portions 161. In addition, in each of the pair of interlock members 112, the inward side folded interlock pieces 162 to 165 and the outward side folded interlock pieces 166 and 167 extend to the same side as the protruding portion 124 from the main plate portion 121 of the plate member 111.

Further, as illustrated in FIGS. 4 to 6, this cover component 14 is assembled in the bridge portion 56 of the caliper body 51 and the claw portion 57. At this time, the cover component 14 is assembled in the bridge portion 56 and the claw portion 57 from a side opposite to the cylinder portion 55 (illustrated in FIG. 3) in the disc axial direction.

When being assembled in the bridge portion 56 and the claw portion 57, the cover component 14 is in a posture in which the pair of interlock members 112 are in the front and the main plate portion 121 of the plate member 111 is in the rear, thereby being fitted into the pair of recessed portions 81 in the pair of interlock members 112.

In an initial stage of this fitting, in one interlock member 112, each of four inward side folded interlock pieces 162 to 165 abuts the end edge portion of one recessed portion 81 on a side opposite to the cylinder portion 55 of the main surface portion 92 in the tip portion 193, and each of the two outward side folded interlock pieces 166 and 167 abuts it in the tip portion 203.

Similarly, in the other interlock member 112 as well, each of four inward side folded interlock pieces 162 to 165 abuts the end edge portion of the other recessed portion 81 on a side opposite to the cylinder portion 55 of the main surface portion 92 in the tip portion 193, and each of the two outward side folded interlock pieces 166 and 167 abuts it in the tip portion 203.

If fitting of the pair of interlock members 112 further proceeds, in one interlock member 112, each of the four inward side folded interlock pieces 162 to 165 rides on the main surface portion 92 of one recessed portion 81 in the boundary portion 195 while elastically deforming to the protruding portion 124 side (mounting target) due to inclination of the tip portion 193, and each of the two outward side folded interlock pieces 166 and 167 rides on the main surface portion 92 of the one recessed portion 81 in the tip edge portion 205 while elastically deforming to the protruding portion 124 side (mounting target) due to inclination of the tip portion 203.

Similarly, in the other interlock member 112 as well, each of the four inward side folded interlock pieces 162 to 165 rides on the main surface portion 92 of the other recessed portion 81 in the boundary portion 195 while elastically deforming to the protruding portion 124 side (mounting target) due to inclination of the tip portion 193, and each of the two outward side folded interlock pieces 166 and 167 rides on the main surface portion 92 of the other recessed portion 81 in the tip edge portion 205 while elastically deforming to the protruding portion 124 side (mounting target) due to inclination of the tip portion 203.

If fitting of the pair of interlock members 112 further proceeds, in one interlock member 112, the boundary portion 195 of each of the four inward side folded interlock pieces 162 to 165 reaches the position of the groove 101 of one recessed portion 81. Thus, each of these four inward side folded interlock pieces 162 to 165 slightly recovers elastic deformation, and each inward side tip portion 194 abuts the end edge portion 105 of the wall surface 103 of this groove 101 on the main surface portion 92 side in the intermediate portion 192. At this time, in each of these four inward side folded interlock pieces 162 to 165, the boundary portion 195 is at a position overlapping this wall surface 103 in the radial direction of this wall surface 103. In addition, at this time, due to an elastic force of each of these four inward side folded interlock pieces 162 to 165, each inward side tip portion 194 is pressed against and abuts the end edge portion 105 of the groove 101 of the one recessed portion 81 in the intermediate portion 192. In parallel with that described above, in the one interlock member 112, the tip edge portion 205 of each of the two outward side folded interlock pieces 166 and 167 reaches the position of the groove 101 of the one recessed portion 81. Thus, these two outward side folded interlock pieces 166 and 167 slightly recover elastic deformation, and each tip edge portion 205 enters this groove 101, thereby facing and abutting the wall surface 103 of this groove 101 in the disc axial direction. In other words, the tip edge portion 205 of each of these two outward side folded interlock pieces 166 and 167 is at a position overlapping this wall surface 103 in the radial direction of this wall surface 103. In addition, at this time, due to an elastic force of each of these outward side folded interlock pieces 166 and 167, each tip edge portion 205 is pressed against and abuts the groove bottom surface 102 of the groove 101 of the one recessed portion 81.

Similarly, in the other interlock member 112 as well, the boundary portion 195 of each of the four inward side folded interlock pieces 162 to 165 reaches the position of the groove 101 of the other recessed portion 81. Thus, each of these four inward side folded interlock pieces 162 to 165 slightly recovers elastic deformation, and each inward side tip portion 194 abuts the end edge portion 105 of the wall surface 103 of this groove 101 on the main surface portion 92 side in the intermediate portion 192. In addition, at this time, due to an elastic force of each of these four inward side folded interlock pieces 162 to 165, each inward side tip portion 194 is pressed against and abuts the end edge portion 105 of the groove 101 of the other recessed portion 81 in the intermediate portion 192.

In addition, in the other interlock member 112, the tip edge portion 205 of each of the two outward side folded interlock pieces 166 and 167 reaches the position of the groove 101 of the other recessed portion 81. Thus, these two outward side folded interlock pieces 166 and 167 slightly recover elastic deformation, and each tip edge portion 205 enters this groove 101, thereby facing and abutting the wall surface 103 of this groove 101 in the disc axial direction. In addition, at this time, due to an elastic force of each of these outward side folded interlock pieces 166 and 167, each tip edge portion 205 is pressed against and abuts the groove bottom surface 102 of the groove 101 of the other recessed portion 81.

Here, at the same time as a total of four tip edge portions 205 of the outward side folded interlock pieces 166 and 167 of one interlock member 112 and the outward side folded interlock pieces 166 and 167 of the other interlock member 112 enters the groove 101 and abuts the wall surface 103, the plate member 111 abuts the bridge portion 56 and the claw portion 57 of the caliper 13 in the main plate portion 121 and stops. In this manner, the cover component 14 is attached to the caliper 13.

In the cover component 14 in an assembled state of being assembled in the caliper 13 as above, as illustrated in FIG. 5, the plate member 111 covers the pair of recessed portions 81 from the outward side opposite to the cylinder portion 55 in the disc axial direction. That is, in the plate member 111, the main plate portion 121 is at a position overlapping the pair of recessed portions 81 in the disc circumferential direction and the disc radial direction. In addition, in this assembled state, in the cover component 14, the pair of interlock members 112 fix the plate member 111 to the caliper 13.

In addition, in the cover component 14 in an assembled state, as in FIG. 6 illustrating the inward side folded interlock pieces 162 and 164, the plurality of inward side folded interlock pieces 162 to 165 maintain a state in which the boundary portions 195 enter the inside of the groove 101 due to elastic forces in the respective inward side tip portions 194 and the intermediate portions 192 abut the end edge portion 105 of the groove 101.

Here, in the cover component 14 in an assembled state, since the intermediate portions 192 of the plurality of inward side folded interlock pieces 162 to 165 of one interlock member 112 in their entirety are inclined in a manner of increasing in diameter as they go away from the main plate portion 121, elastic forces of these inward side folded interlock pieces 162 to 165 generate a component in a direction in which the main plate portion 121 is caused to abut the bridge portion 56 and the claw portion 57. In the cover component 14 in an assembled state, similarly, elastic forces of the plurality of inward side folded interlock pieces 162 to 165 of the other interlock member 112 also generate a component in a direction in which the main plate portion 121 is caused to abut the bridge portion 56 and the claw portion 57. As a result, in the cover component 14 in an assembled state, the pair of interlock members 112 cause the main plate portion 121 of the plate member 111 to abut, in other words, to closely adhere to the bridge portion 56 and the claw portion 57 by means of elastic forces. At this time, in the main plate portion 121, parts on an outward side in the disc radial direction from the protruding portions 124 mainly abut the bridge portion 56 and the claw portion 57.

In addition, in the cover component 14 in an assembled state, as in FIG. 6 illustrating the outward side folded interlock piece 166, the plurality of outward side folded interlock pieces 166 and 167 of one interlock member 112 restrict movement from the claw portion 57 in a separation direction opposite to the cylinder portion 55 by abutting the wall surface 103 of the groove 101 that is an engagement target of the claw portion 57. In the cover component 14 in an assembled state, the plurality of outward side folded interlock pieces 166 and 167 of the other interlock member 112 restrict movement from the claw portion 57 in a separation direction opposite to the cylinder portion 55 by abutting the wall surface 103 of the groove 101 that is an engagement target of the claw portion 57.

In addition, in the cover component 14 in an assembled state, the plate member 111 covers the two recessed portions 81 in the axial direction of the cylinder holes 71. In addition, in the cover component 14 in an assembled state, the pair of interlock members 112 fix the plate member 111 to the caliper 13. In addition, in the cover component 14 in an assembled state, each of the pair of interlock members 112 is fixed to the plate member 111 in the fixing portion 161.

In addition, in one interlock member 112 of the cover component 14 in an assembled state, the inward side folded interlock piece 162 thereof extends from the fixing portion 161 thereof in a manner of approaching this cylinder hole 71 in the axial direction of one cylinder holes 71 positionally aligned with this interlock member 112 in the disc circumferential direction. In the one interlock member 112 of the cover component 14 in an assembled state, the inward side tip portion 194 of the inward side folded interlock piece 162 thereof is folded to the inward side of the one cylinder hole 71 in the radial direction. In the one interlock member 112 of the cover component 14 in an assembled state, the inward side tip portion 194 of the inward side folded interlock piece 162 thereof abuts the end edge portion 105 of the groove 101 that is an engagement target in the intermediate portion 192. The same also applies to the other interlock member 112 of the cover component 14 in an assembled state.

In addition, in one interlock member 112 of the cover component 14 in an assembled state, the inward side folded interlock piece 163 thereof extends from the fixing portion 161 thereof in a manner of approaching this cylinder hole 71 in the axial direction of one cylinder holes 71 positionally aligned with this interlock member 112 in the disc circumferential direction. In the one interlock member 112 of the cover component 14 in an assembled state, the inward side tip portion 194 of the inward side folded interlock piece 163 thereof is folded to the inward side of the one cylinder hole 71 in the radial direction. In the one interlock member 112 of the cover component 14 in an assembled state, the inward side tip portion 194 of the inward side folded interlock piece 163 thereof abuts the end edge portion 105 of the groove 101 that is an engagement target in the intermediate portion 192. The same also applies to the other interlock member 112 of the cover component 14 in an assembled state.

In addition, in one interlock member 112 of the cover component 14 in an assembled state, the inward side folded interlock piece 164 thereof extends from the fixing portion 161 thereof in a manner of approaching this cylinder hole 71 in the axial direction of one cylinder holes 71 positionally aligned with this interlock member 112 in the disc circumferential direction. In the one interlock member 112 of the cover component 14 in an assembled state, the inward side tip portion 194 of the inward side folded interlock piece 164 thereof is folded to the inward side of the one cylinder hole 71 in the radial direction. In the one interlock member 112 of the cover component 14 in an assembled state, the inward side tip portion 194 of the inward side folded interlock piece 164 thereof abuts the end edge portion 105 of the groove 101 that is an engagement target in the intermediate portion 192. The same also applies to the other interlock member 112 of the cover component 14 in an assembled state.

In addition, in one interlock member 112 of the cover component 14 in an assembled state, the inward side folded interlock piece 165 thereof extends from the fixing portion 161 thereof in a manner of approaching this cylinder hole 71 in the axial direction of one cylinder holes 71 positionally aligned with this interlock member 112 in the disc circumferential direction. In the one interlock member 112 of the cover component 14 in an assembled state, the inward side tip portion 194 of the inward side folded interlock piece 165 thereof is folded to the inward side of the one cylinder hole 71 in the radial direction. In the one interlock member 112 of the cover component 14 in an assembled state, the inward side tip portion 194 of the inward side folded interlock piece 165 thereof abuts the end edge portion 105 of the groove 101 that is an engagement target in the intermediate portion 192. The same also applies to the other interlock member 112 of the cover component 14 in an assembled state.

In addition, in one interlock member 112 of the cover component 14 in an assembled state, the outward side folded interlock piece 166 thereof extends from the fixing portion 161 thereof in a manner of approaching this cylinder hole 71 in the axial direction of one cylinder holes 71 positionally aligned with this interlock member 112 in the disc circumferential direction. In the one interlock member 112 of the cover component 14 in an assembled state, the outward side tip portion 204 of the outward side folded interlock piece 166 thereof is folded to the outward side of the one cylinder hole 71 in the radial direction. In the one interlock member 112 of the cover component 14 in an assembled state, the outward side tip portion 204 of the outward side folded interlock piece 166 thereof abuts the wall surface 103 of the groove 101 that is an engagement target in the tip edge portion 205. The same also applies to the other interlock member 112 of the cover component 14 in an assembled state.

In addition, in one interlock member 112 of the cover component 14 in an assembled state, the outward side folded interlock piece 167 thereof extends from the fixing portion 161 thereof in a manner of approaching this cylinder hole 71 in the axial direction of one cylinder holes 71 positionally aligned with this interlock member 112 in the disc circumferential direction. In the one interlock member 112 of the cover component 14 in an assembled state, the outward side tip portion 204 of the outward side folded interlock piece 167 thereof is folded to the outward side of the one cylinder hole 71 in the radial direction. In the one interlock member 112 of the cover component 14 in an assembled state, the outward side tip portion 204 of the outward side folded interlock piece 167 thereof abuts the wall surface 103 of the groove 101 that is an engagement target in the tip edge portion 205. The same also applies to the other interlock member 112 of the cover component 14 in an assembled state.

In addition, in one interlock member 112 of the cover component 14 in an assembled state, as illustrated in FIG. 4, when an axis which connects the center portion and the fixing portion 161 thereof and the bridge portion 56 is a first axis A1, and when an axis which is orthogonal to this first axis A1, is orthogonal to the disc axial direction, and passes through the center portion of the fixing portion 161 thereof is a second axis A2, the outward side folded interlock piece 166 thereof and the outward side folded interlock piece 167 thereof disposed with the first axis A1 interposed therebetween when viewed in the disc axial direction, and the outward side folded interlock piece 166 thereof and the outward side folded interlock piece 167 thereof are disposed in a manner of overlapping each other when viewed in the direction of the second axis A2. The same also applies to the other interlock member 112 of the cover component 14 in an assembled state.

In addition, in one interlock member 112 of the cover component 14 in an assembled state, the inward side folded interlock piece 162 thereof and the inward side folded interlock piece 163 thereof are disposed with the first axis A1 interposed therebetween when viewed in the disc axial direction, and the inward side folded interlock piece 162 thereof and the inward side folded interlock piece 163 thereof are disposed in a manner of overlapping each other when viewed in the direction of the second axis A2. The same also applies to the other interlock member 112 of the cover component 14 in an assembled state.

In addition, in one interlock member 112 of the cover component 14 in an assembled state, the inward side folded interlock piece 164 thereof and the inward side folded interlock piece 165 thereof are disposed with the first axis A1 interposed therebetween when viewed in the disc axial direction, and the inward side folded interlock piece 164 thereof and the inward side folded interlock piece 165 thereof are disposed in a manner of overlapping each other when viewed in the direction of the second axis A2. The same also applies to the other interlock member 112 of the cover component 14 in an assembled state.

In addition, in one interlock member 112 of the cover component 14 in an assembled state, the outward side folded interlock piece 166 thereof and the outward side folded interlock piece 167 thereof are disposed on a side of the bridge portion 56 from the center portion of the fixing portion 161 in the direction of the first axis A1 when viewed in the disc axial direction, and the inward side folded interlock piece 162 and the inward side folded interlock piece 163 are disposed on a side opposite to the bridge portion 56 from the center portion of the fixing portion 161 in the direction of the first axis A1 when viewed in the disc axial direction. The same also applies to the other interlock member 112 of the cover component 14 in an assembled state.

In addition, in one interlock member 112 of the cover component 14 in an assembled state, in the circumferential direction of the fixing portion 161 thereof, the outward side folded interlock piece 166 thereof is disposed between the inward side folded interlock piece 162 thereof and the inward side folded interlock piece 164 thereof, and the outward side folded interlock piece 167 thereof is disposed between the inward side folded interlock piece 163 thereof and the inward side folded interlock piece 165 thereof. The same also applies to the other interlock member 112 of the cover component 14 in an assembled state.

In addition, in one interlock member 112 of the cover component 14 in an assembled state, the inward side folded interlock piece 164 thereof and the outward side folded interlock piece 166 thereof, and the inward side folded interlock piece 165 thereof and the outward side folded interlock piece 167 thereof are disposed on a side of the bridge portion 56 from the center portion of the fixing portion 161 in the direction of the first axis A1 when viewed in the disc axial direction, and the inward side folded interlock piece 162 thereof and the inward side folded interlock piece 163 thereof are disposed on a side opposite to the bridge portion 56 from the center portion of the fixing portion 161 in the direction of the first axis A1 when viewed in the disc axial direction.

In addition, the plate member 111 of the cover component 14 in an assembled state includes the pair of protruding portions 124 which extends in a manner of approaching the cylinder hole 71 from the main plate portion 121 in the axial direction of the cylinder holes 71. In one interlock member 112 of the cover component 14 in an assembled state, the plurality of guide interlock pieces 178 abutting the outer circumferential surface 150 of the corresponding protruding portion 124 are provided on the central side of the fixing portion 161 thereof. The same also applies to the other interlock member 112 of the cover component 14 in an assembled state.

In addition, in the cover component 14 in an assembled state, the plurality of inward side folded interlock pieces 162 to 165 and the plurality of outward side folded interlock pieces 166 and 167 of one interlock member 112 extend in a direction inclined with respect to the axial direction of the cylinder holes 71, in other words, the movement direction of the piston 72 from the fixing portion 161. The same also applies to the other interlock member 112 of the cover component 14 in an assembled state.

In addition, in an assembled state, in the cover component 14, the plurality of inward side folded interlock pieces 162 to 165 and the plurality of outward side folded interlock pieces 166 and 167 of one interlock member 112 abut the inner circumferential surface 91 of the recessed portion 81 that is an engagement target by means of elastic forces. In other words, in an assembled state, in the cover component 14, the plurality of inward side folded interlock pieces 162 to 165 and the plurality of outward side folded interlock pieces 166 and 167 of one interlock member 112 are provided in the recessed portion 81 that is an engagement target of the interlock member 112. The same also applies to the other interlock member 112 of the cover component 14 in an assembled state. Thus, in the caliper 13 in a state in which the cover component 14 is assembled therein, the interlock members 112 are respectively disposed in the two recessed portions 81.

In addition, in an assembled state, in the cover component 14, the plurality of inward side folded interlock pieces 162 to 165 and the plurality of outward side folded interlock pieces 166 and 167 of one interlock member 112 abut the groove 101 of the recessed portion 81 that is an engagement target. The same also applies to the other interlock member 112 of the cover component 14 in an assembled state.

In addition, in the cover component 14 in an assembled state, the plate member 111 abuts the bridge portion 56 on the outward side in the disc radial direction from the protruding portions 124 to which the interlock members 112 are fixed.

In the disc brake 10, a brake fluid is introduced into two cylinder holes 71 of the cylinder portion 55 of the caliper 13 via a brake piping (not illustrated). Consequently, a brake fluid pressure acts on the piston 72 in each of the two cylinder holes 71. As a result, both the pistons 72 move forward to the disc 11 side, and pressurizes the friction pads 17 on the inner side, of the friction pads 17 and 18, disposed between these pistons 72 and the disc 11, toward the disc 11. Accordingly, this friction pad 17 moves in the disc axial direction and comes into contact with the surface 11*a* of the disc 11. In other words, the piston 72 for moving the friction pads 17 on the inner side of the friction pads 17 and 18 is disposed in the cylinder hole 71 of the cylinder portion 55.

In addition, due to a reaction force of this pressurization, the caliper body 51 causes the slide pins 47 to slide with respect to the attachment member 12 and move in the disc axial direction, and the claw portion 57 pressurizes the friction pads 18 on the outer side, of the friction pads 17 and 18, disposed between the claw portion 57 and the disc 11 toward the disc 11. Accordingly, these friction pads 18 move in the disc axial direction and come into contact with the surface 11*b* of disc 11.

In this manner, in the caliper 13, due to operation of the plurality of pistons 72, the friction pads 17 and 18 are sandwiched between these pistons 72 and the claw portion 57 from both sides and pressurized against both the surfaces 11*a* and 11*b* of the disc 11. As a result, the caliper 13 generates a braking force by applying a frictional resistance to the disc 11. The caliper 13 is a floating-type caliper and is a fist-type caliper.

In the disc brake according to Patent Document 1, a cover component is mounted in a part of a caliper that can be seen when viewed from the outside of a vehicle. It is desired to improve adhesion of such a cover component to a caliper and curb falling off of the cover component from the caliper.

The disc brake 10 and the cover component 14 of the embodiment have the interlock members 112 for fixing the plate member 111, which covers the recessed portions 81 from a side opposite to the cylinder portion 55 in the axial direction of the cylinder hole 71, to the caliper 13. Further, for example, this interlock member 112 has the inward side folded interlock piece 162 and the outward side folded interlock piece 166 both of which extend in the axial direction of the cylinder holes 71 from the fixing portions 161 fixed to the plate member 111. In the inward side folded interlock piece 162, the inward side tip portion 194 folded to the inward side of the cylinder hole 71 in the radial direction abuts the groove 101 on the inner circumferential surface 91 of the recessed portion 81, and in the outward side folded interlock piece 166, the outward side tip portion 204 folded to the outward side of the cylinder hole 71 in the radial direction abuts the groove 101 on the inner circumferential surface 91 of the recessed portion 81. In this manner, in the inward side folded interlock piece 162, since the inward side tip portion 194 folded to the inward side of the cylinder hole 71 in the radial direction abuts the groove 101 of the inner circumferential surface 91 of the recessed portion 81, movement of the interlock member 112 in the radial direction of the cylinder holes 71 can be curbed. In addition, in the outward side folded interlock piece 166, since the outward side tip portion 204 folded to the outward side of the cylinder hole 71 in the radial direction abuts the groove 101 of the inner circumferential surface 91 of the recessed portion 81, movement of the interlock member 112 to a side opposite to the cylinder portion 55 in the axial direction of the cylinder hole 71, that is, coming out from the recessed portion 81 can be curbed. Therefore, it is possible to improve adhesion of the cover component 14 to the caliper 13 and curb falling out of the cover component 14 from the caliper 13.

In addition, since the inward side folded interlock piece 162 and the outward side folded interlock piece 166 can be elastically deformed, if the inward side folded interlock piece 162 and the outward side folded interlock piece 166 are fitted into the recessed portion 81 while being elastically deformed, the cover component 14 can be assembled in the caliper 13. Thus, it is easy to assemble the cover component 14 in the caliper 13. Furthermore, since the cover component 14 can be attached to the caliper 13 without using an attachment bolt or a rivet, it is easy to perform attachment, and they have excellent appearance.

In addition, in addition to the outward side folded interlock piece 166, the interlock member 112 further has the outward side folded interlock piece 167 which extends in the axial direction of the cylinder holes 71 from the fixing portion 161 fixed to the plate member 111. In this outward side folded interlock piece 167 as well, the outward side tip portion 204 folded to the outward side of the cylinder hole 71 in the radial direction abuts the groove 101 of the inner circumferential surface 91 of the recessed portion 81. Thus, since each of the two outward side folded interlock pieces 166 and 167 abuts the groove 101 of the inner circumferential surface 91 of the recessed portion 81 in the outward side tip portion 204 folded to the outward side of the cylinder hole 71 in the radial direction, it is possible to further curb movement of the interlock member 112 to a side opposite to the cylinder portion 55 in the axial direction of the cylinder hole 71, that is, coming-out from the recessed portion 81. Therefore, it is possible to further curb falling out of the cover component 14 from the caliper 13.

In addition, the outward side folded interlock piece 166 and the outward side folded interlock piece 167 of the interlock member 112 are disposed with the first axis A1 interposed therebetween when viewed in the disc axial direction, and the outward side folded interlock piece 166 and the outward side folded interlock piece 167 are disposed in a manner of overlapping each other when viewed in the direction of the second axis A2. Thus, since the outward side folded interlock piece 166 and the outward side folded interlock piece 167 can be disposed away from each other, it is possible to further curb movement of the interlock member 112 to a side opposite to the cylinder portion 55 in the axial direction of the cylinder hole 71, that is, coming-out from the recessed portion 81. Therefore, it is possible to further curb falling out of the cover component 14 from the caliper 13.

In addition, in addition to the inward side folded interlock piece 162, the interlock member 112 further has the inward side folded interlock piece 163 which extends in the axial direction of the cylinder holes 71 from the fixing portion 161 fixed to the plate member 111. In this inward side folded interlock piece 163 as well, the inward side tip portion 194 folded to the inward side of the cylinder hole 71 in the radial direction abuts the groove 101 of the inner circumferential surface 91 of the recessed portion 81. Thus, since each of the two inward side folded interlock pieces 162 and 163 abuts the groove 101 of the inner circumferential surface 91 of the recessed portion 81 in the inward side tip portion 194 folded to the inward side of the cylinder hole 71 in the radial direction, it is possible to further curb movement of the interlock member 112 in the radial direction of the cylinder holes 71. Furthermore, the inward side folded interlock piece 162 and the inward side folded interlock piece 163 of the interlock member 112 are disposed with the first axis A1 interposed therebetween when viewed in the disc axial direction, and the inward side folded interlock piece 162 and the inward side folded interlock piece 163 are disposed in a manner of overlapping each other when viewed in the direction of the second axis A2. Thus, since the inward side folded interlock piece 162 and the inward side folded interlock piece 163 can be disposed away from each other, it is possible to further curb movement of the interlock member 112 in the radial direction of the cylinder holes 71. Therefore, it is possible to further enhance adhesion of the cover component 14 to the caliper 13.

In addition, in the interlock member 112, the outward side folded interlock piece 166 and the outward side folded interlock piece 167 are disposed on a side of the bridge portion 56 from the center portion of the fixing portion 161 in the direction of the first axis A1 when viewed in the disc axial direction, and the inward side folded interlock piece 162 and the inward side folded interlock piece 163 are disposed on a side opposite to the bridge portion 56 from the center portion of the fixing portion 161 in the direction of the first axis A1 when viewed in the disc axial direction. Accordingly, the inward side folded interlock piece 162 and the inward side folded interlock piece 163 can bias the interlock member 112 toward the bridge portion 56 side of the recessed portion 81, that is, the bottom side of the recessed portion 81. Therefore, it is possible to further enhance adhesion of the cover component 14 to the caliper 13.

In addition, in addition to the inward side folded interlock piece 162, the interlock member 112 further has the inward side folded interlock piece 164 which extends in the axial direction of the cylinder holes 71 from the fixing portion 161 fixed to the plate member 111. In this inward side folded interlock piece 164 as well, the inward side tip portion 194 folded to the inward side of the cylinder hole 71 in the radial direction abuts the groove 101 of the inner circumferential surface 91 of the recessed portion 81. Thus, since each of the two inward side folded interlock pieces 162 and 164 abuts the groove 101 of the inner circumferential surface 91 of the recessed portion 81 in the inward side tip portion 194 folded to the inward side of the cylinder hole 71 in the radial direction, it is possible to further curb movement of the interlock member 112 in the radial direction of the cylinder holes 71. Therefore, it is possible to further enhance adhesion of the cover component 14 to the caliper 13.

In addition, in the interlock member 112, the inward side folded interlock piece 162 is disposed on a side opposite to the bridge portion 56 from the center portion of the interlock member 112 in the direction of the first axis A1 when viewed in the disc axial direction. Accordingly, the inward side folded interlock piece 162 can bias the interlock member 112 toward the bridge portion 56 side of the recessed portion 81, that is, the bottom side of the recessed portion 81. Therefore, it is possible to further enhance adhesion of the cover component 14 to the caliper 13.

In addition, in the interlock member 112, the outward side folded interlock piece 166 is disposed between the inward side folded interlock piece 162 and the inward side folded interlock piece 164 in the circumferential direction of the fixing portion 161. Thus, since the inward side folded interlock piece 162 and the inward side folded interlock piece 164 can be separated in the circumferential direction of the fixing portion 161, it is possible to further curb movement of the interlock member 112 in the radial direction of the cylinder holes 71. Therefore, it is possible to further enhance adhesion of the cover component to the caliper.

In addition, in the interlock member 112, the inward side folded interlock piece 164 and the outward side folded interlock piece 166 are disposed on a side of the bridge portion 56 from the center portion of the fixing portion 161 in the direction of the first axis A1 when viewed in the disc axial direction, and the inward side folded interlock piece 162 is disposed on a side opposite to the bridge portion 56 from the center portion of the fixing portion 161 in the direction of the first axis A1 when viewed in the disc axial direction. Accordingly, after the inward side folded interlock piece 162 and the inward side folded interlock piece 164 are separated in the direction of the first axis A1, the inward side folded interlock pieces 162 and 164 and the outward side folded interlock piece 166 can be disposed in a well-balanced manner. Thus, it is possible to further curb movement of the interlock member 112 in the radial direction of the cylinder holes 71. Therefore, it is possible to further enhance adhesion of the cover component to the caliper.

In addition, the plate member 111 includes the protruding portion 124 which extends in the axial direction of the cylinder holes 71, and the interlock member 112 is provided with the plurality of guide interlock pieces 178 abutting the outer circumferential surface 150 of the protruding portion 124 on the central side of the fixing portion 161. For this reason, when the fixing portion 161 of the interlock member 112 is attached to the protruding portion 124 of the plate member 111, the plurality of guide interlock pieces 178 can be guided by the outer circumferential surface 150 of the protruding portion 124. Therefore, it is easy to attach the interlock member 112 to the plate member 111. Moreover, since the protruding portion 124 abuts the plurality of guide interlock pieces 178 on the outer circumferential surface 150, movement of the plate member 111 in the radial direction of the cylinder holes 71 with respect to the interlock member 112 can be curbed. In addition, in the interlock member 112, since the plurality of guide interlock pieces 178 are provided on the central side of the fixing portion 161, the inward side folded interlock piece 162 and the outward side folded interlock piece 166 can be formed on a side opposite to the center of the fixing portion 161. Thus, manufacturing of the interlock member 112 is facilitated.

In addition, the plate member 111 includes two protruding portions 124, and the plurality of guide interlock pieces 178 provided in each of the two interlock members 112 abut the outer circumferential surface 150 of the corresponding protruding portion 124 and are attached to the plate member 111. For this reason, accuracy of attachment positions of the two interlock members 112 can be enhanced. Thus, the interlock member 112 can be smoothly and favorably can be fitted on the inner circumferential surface 91 of each of the two recessed portions 81 provided in the caliper 13. That is, if the two interlock members 112 are attached to the plate member 111 in a misaligned manner, there is a probability that a force greater than estimated will be required or the interlock member 112 will be damaged when it is fitted on the inner circumferential surface 91 of the recessed portion 81, but such circumstances can be avoided.

A disc brake according to a first aspect of the embodiment described above includes an attachment member (for example, the attachment member 12) that is fixed to a non-rotation portion of a vehicle and provided in a manner of straddling an outer circumferential side of a disc (for example, the disc 11); a first friction pad (for example, the friction pad 17) that is movably provided in the attachment member and disposed in a manner of facing one surface (for example, the surface 11*a*) of the disc in an axial direction; a second friction pad (for example, the friction pad 18) that is movably provided in the attachment member and disposed in a manner of facing the other surface (for example, the surface 11*b*) of the disc in the axial direction; a piston (for example, the piston 72) that pressurizes the first friction pad; a caliper (for example, the caliper 13) that accommodates the piston to be able to move in the axial direction of the disc and has a cylinder portion (for example, the cylinder portion 55) which has a cylinder hole (for example, the cylinder hole 71) accommodating the piston, a bridge portion (for example, the bridge portion 56) which is provided in a manner of straddling the outer circumferential side of the disc from the cylinder portion, a claw portion (for example, the claw portion 57) which is provided in a manner of facing the cylinder portion in an axial direction of the cylinder hole from the bridge portion, and a recessed portion (for example, the recessed portions 81) which is provided in the claw portion in a manner of facing the cylinder hole and has a groove (for example, the groove 101) on an inner circumferential surface (for example, the inner circumferential surface 91); a plate member (for example, the plate member 111) that covers the recessed portion in the axial direction of the cylinder hole; and an interlock member (for example, the interlock member 112) that fixes the plate member to the caliper and has a fixing portion (for example, the fixing portion 161) which is fixed to the plate member, a first inward side folded interlock piece (for example, the inward side folded interlock piece 162) which extends in the axial direction of the cylinder hole from the fixing portion and in which a first inward side tip portion (for example, the inward side tip portion 194) folded to an inward side of the cylinder hole in a radial direction abuts the groove, and a first outward side folded interlock piece (for example, the outward side folded interlock piece 166) which extends in the axial direction of the cylinder hole from the fixing portion and in which a first outward side tip portion (for example, the outward side tip portion 204) folded to an outward side of the cylinder hole in the radial direction abuts the groove. Accordingly, it is possible to improve adhesion of a cover component to a caliper and curb falling off of the cover component from the caliper.

In the disc brake of a second aspect, according to the first aspect, the interlock member includes a second outward side folded interlock piece (for example, the outward side tip portion 204) which extends in the axial direction of the cylinder hole from the fixing portion and in which a second outward side tip portion (for example, the outward side folded interlock piece 167) folded to the outward side of the cylinder hole in the radial direction abuts the groove.

In the disc brake of a third aspect, according to the second aspect, when an axis which connects a center portion of the fixing portion and the bridge portion is a first axis (for example, the first axis A1), and when an axis which is orthogonal to the first axis, is orthogonal to the axial direction of the disc, and passes through the center portion of the fixing portion is a second axis (for example, the second axis A2), the first outward side folded interlock piece and the second outward side folded interlock piece are disposed with the first axis interposed therebetween when viewed in the axial direction of the disc, and the first outward side folded interlock piece and the second outward side folded interlock piece are disposed in a manner of overlapping each other when viewed in a direction of the second axis.

In the disc brake of a fourth aspect, according to the third aspect, the interlock member includes a second inward side folded interlock piece (for example, the inward side folded interlock piece 163) which extends in the axial direction of the cylinder hole from the fixing portion and in which a second inward side tip portion (for example, the inward side tip portion 194) folded to the inward side of the cylinder hole in the radial direction abuts the groove, the first inward side folded interlock piece and the second inward side folded interlock piece are disposed with the first axis interposed therebetween when viewed in the axial direction of the disc, and the first inward side folded interlock piece and the second inward side folded interlock piece are disposed in a manner of overlapping each other when viewed in the direction of the second axis.

In the disc brake of a fifth aspect, according to the fourth aspect, the first outward side folded interlock piece and the second outward side folded interlock piece are disposed on a side of the bridge portion from the center portion of the fixing portion in a direction of the first axis when viewed in the axial direction of the disc, and the first inward side folded interlock piece and the second inward side folded interlock piece are disposed on a side opposite to the bridge portion from the center portion of the fixing portion in the direction of the first axis when viewed in the axial direction of the disc.

In the disc brake of a sixth aspect, according to the second aspect, the interlock member includes a second inward side folded interlock piece (for example, the inward side folded interlock piece 163) which extends in the axial direction of the cylinder hole from the fixing portion and in which a second inward side tip portion (for example, the inward side tip portion 194) folded to the inward side of the cylinder hole in the radial direction abuts the groove.

In the disc brake of a seventh aspect, according to the first aspect, when an axis which connects a center portion of the fixing portion and the bridge portion is a first axis (for example, the first axis A1), and when an axis which is orthogonal to the first axis, is orthogonal to the axial direction of the disc, and passes through the center portion of the fixing portion is a second axis (for example, the second axis A2), the first inward side folded interlock piece is disposed on a side opposite to the bridge portion from a center portion of the interlock member in a direction of the first axis when viewed in the axial direction of the disc.

In the disc brake of an eighth aspect, according to the first aspect, the interlock member includes a second inward side folded interlock piece (for example, the inward side folded interlock piece 164) which extends in the axial direction of the cylinder hole from the fixing portion and in which a second inward side tip portion (for example, the inward side tip portion 194) folded to the inward side of the cylinder hole in the radial direction abuts the groove.

In the disc brake of a ninth aspect, according to the eighth aspect, the first outward side folded interlock piece is disposed between the first inward side folded interlock piece and the second inward side folded interlock piece in a circumferential direction of the fixing portion.

In the disc brake of a tenth aspect, according to the ninth aspect, when an axis which connects a center portion of the fixing portion and the bridge portion is a first axis (for example, the first axis A1), and when an axis which is orthogonal to the first axis, is orthogonal to the axial direction of the disc, and passes through the center portion of the fixing portion is a second axis (for example, the second axis A2), the second inward side folded interlock piece and the first outward side folded interlock piece are disposed on a side of the bridge portion from the center portion of the fixing portion in a direction of the first axis when viewed in the axial direction of the disc, and the first inward side folded interlock piece is disposed on a side opposite to the bridge portion from the center portion of the fixing portion in the direction of the first axis when viewed in the axial direction of the disc.

In the disc brake of an eleventh aspect, according to the first aspect, the plate member includes a protruding portion (for example, the protruding portion 124) which extends in the axial direction of the cylinder hole, and a plurality of guide interlock pieces (for example, the guide interlock pieces 178) which abut an outer circumferential surface (for example, the outer circumferential surface 150) of the protruding portion are provided on a central side of the fixing portion.

A cover component according to a twelfth aspect is a cover component constituting a disc brake including an attachment member (for example, the attachment member 12) that is fixed to a non-rotation portion of a vehicle and provided in a manner of straddling an outer circumferential side of a disc (for example, the disc 11); a first friction pad (for example, the frictions pad 17) that is movably provided in the attachment member and disposed in a manner of facing one surface (for example, the surface 11*a*) of the disc in an axial direction; a second friction pad (for example, the friction pads 18) that is movably provided in the attachment member and disposed in a manner of facing the other surface (for example, the surface 11*b*) of the disc in the axial direction; a piston (for example, the piston 72) that pressurizes the first friction pad; and a caliper (for example, the caliper 13) that accommodates the piston to be able to move in the axial direction of the disc and has a cylinder portion (for example, the cylinder portion 55) which has a cylinder hole (for example, the cylinder hole 71) accommodating the piston, a bridge portion (for example, the bridge portion 56) which is provided in a manner of straddling the outer circumferential side of the disc from the cylinder portion, a claw portion (for example, the claw portion 57) which is provided in a manner of facing the cylinder portion in an axial direction of the cylinder hole from the bridge portion, and a recessed portion (for example, the recessed portions 81) which is provided in the claw portion in a manner of facing the cylinder hole and has a groove (for example, the groove 101) on an inner circumferential surface (for example, the inner circumferential surface 91). The cover component includes a plate member (for example, the plate member 111) that covers the recessed portion in the axial direction of the cylinder hole; and an interlock member (for example, the interlock member 112) that fixes the plate member to the caliper and has a fixing portion (for example, the fixing portion 161) which is fixed to the plate member, a first inward side folded interlock piece (for example, the inward side folded interlock piece 162) which extends in the axial direction of the cylinder hole from the fixing portion and in which a first inward side tip portion (for example, the inward side tip portion 194) folded to an inward side of the cylinder hole in a radial direction abuts the groove, and a first outward side folded interlock piece (for example, the outward side folded interlock piece 166) which extends in the axial direction of the cylinder hole from the fixing portion and in which a first outward side tip portion (for example, the outward side tip portion 204) folded to an outward side of the cylinder hole in the radial direction abuts the groove. Accordingly, it is possible to improve adhesion of a cover component to a caliper and curb falling off of the cover component from the caliper.

INDUSTRIAL APPLICABILITY

According to the present invention, it is possible to improve adhesion of a cover component to a caliper and curb falling off of the cover component from the caliper. Thus, industrial applicability is significant.

REFERENCE SIGNS LIST

10 Disc brake
11 Disc
11*a*, 11*b* Surface
12 Attachment member
13 Caliper
14 Cover component
17, 18 Friction pad
55 Cylinder portion
56 Bridge portion
57 Claw portion
71 Cylinder hole
72 Piston 72
81 Recessed portion
91 Inner circumferential surface
101 Groove
111 Plate member
112 Interlock member
124 Protruding portion
150 Outer circumferential surface
161 fixing portion
162 to 165 Inward side folded interlock piece
166, 167 Outward side folded interlock piece
178 Guide interlock piece
194 Inward side tip portion
204 Outward side tip portion
A1 First axis
A2 Second axis

The invention claimed is:

1. A disc brake comprising:

an attachment member that is fixed to a non-rotation portion of a vehicle and provided in a manner of straddling an outer circumferential side of a disc;

a first friction pad that is movably provided in the attachment member and disposed in a manner of facing one surface of the disc in an axial direction;

a second friction pad that is movably provided in the attachment member and disposed in a manner of facing the other surface of the disc in the axial direction;

a piston that pressurizes the first friction pad;

a caliper that accommodates the piston to be able to move in the axial direction of the disc and has a cylinder portion which has a cylinder hole accommodating the piston, a bridge portion which is provided in a manner of straddling the outer circumferential side of the disc from the cylinder portion, a claw portion which is provided in a manner of facing the cylinder portion in an axial direction of the cylinder hole from the bridge portion, and a recessed portion which is provided in the claw portion in a manner of facing the cylinder hole and has a groove on an inner circumferential surface;

a plate member that covers the recessed portion in the axial direction of the cylinder hole; and an interlock member that fixes the plate member to the caliper and has a fixing portion which is fixed to the plate member, a first inward side folded interlock piece which extends in the axial direction of the cylinder hole from the fixing portion and in which a first inward side tip portion folded to an inward side of the cylinder hole in a radial direction abuts the groove, and a first outward side folded interlock piece which extends in the axial direction of the cylinder hole from the fixing portion and in which a first outward side tip portion folded to an outward side of the cylinder hole in the radial direction abuts the groove.

2. The disc brake according to claim 1, wherein the interlock member includes a second outward side folded interlock piece which extends in the axial direction of the cylinder hole from the fixing portion and in which a second outward side tip portion folded to the outward side of the cylinder hole in the radial direction abuts the groove.

3. The disc brake according to claim 2, wherein when an axis which connects a center portion of the fixing portion and the bridge portion is a first axis, and when an axis which is orthogonal to the first axis, is orthogonal to the axial direction of the disc, and passes through the center portion of the fixing portion is a second axis, the first outward side folded interlock piece and the second outward side folded interlock piece are disposed with the first axis interposed therebetween when viewed in the axial direction of the disc, and the first outward side folded interlock piece and the second outward side folded interlock piece are disposed in a manner of overlapping each other when viewed in a direction of the second axis.

4. The disc brake according to claim 3, wherein the interlock member includes a second inward side folded interlock piece which extends in the axial direction of the cylinder hole from the fixing portion and in which a second inward side tip portion folded to the inward side of the cylinder hole in the radial direction abuts the groove, the first inward side folded interlock piece and the second inward side folded interlock piece are disposed with the first axis interposed therebetween when viewed in the axial direction of the disc, and the first inward side folded interlock piece and the second inward side folded interlock piece are disposed in a manner of overlapping each other when viewed in the direction of the second axis.

5. The disc brake according to claim 4, wherein the first outward side folded interlock piece and the second outward side folded interlock piece are disposed on a side of the bridge portion from the center portion of the fixing portion in a direction of the first axis when viewed in the axial direction of the disc, and the first inward side folded interlock piece and the second inward side folded interlock piece are disposed on a side opposite to the bridge portion from the center portion of the fixing portion in the direction of the first axis when viewed in the axial direction of the disc.

6. The disc brake according to claim 2, wherein the interlock member includes a second inward side folded interlock piece which extends in the axial direction of the cylinder hole from the fixing portion and in which a second inward side tip portion folded to the inward side of the cylinder hole in the radial direction abuts the groove.

7. The disc brake according to claim 1, wherein when an axis which connects a center portion of the fixing portion and the bridge portion is a first axis, and when an axis which is orthogonal to the first axis, is orthogonal to the axial direction of the disc, and passes through the center portion of the fixing portion is a second axis, the first inward side folded interlock piece is disposed on a side opposite to the bridge portion from a center portion of the interlock member in a direction of the first axis when viewed in the axial direction of the disc.

8. The disc brake according to claim 1, wherein the interlock member includes a second inward side folded interlock piece which extends in the axial direction of the cylinder hole from the fixing portion and in which a second inward side tip portion folded to the inward side of the cylinder hole in the radial direction abuts the groove.

9. The disc brake according to claim 8, wherein the first outward side folded interlock piece is disposed between the first inward side folded interlock piece and the second inward side folded interlock piece in a circumferential direction of the fixing portion.

10. The disc brake according to claim 9, wherein when an axis which connects a center portion of the fixing portion and the bridge portion is a first axis, and when an axis which is orthogonal to the first axis, is orthogonal to the axial direction of the disc, and passes through the center portion of the fixing portion is a second axis, the second inward side folded interlock piece and the first outward side folded interlock piece are disposed on a side of the bridge portion from the center portion of the fixing portion in a direction of the first axis when viewed in the axial direction of the disc, and the first inward side folded interlock piece is disposed on a side opposite to the bridge portion from the center portion of the fixing portion in the direction of the first axis when viewed in the axial direction of the disc.

11. The disc brake according to claim 1, wherein the plate member includes a protruding portion which extends in the axial direction of the cylinder hole, and a plurality of guide interlock pieces which abut an outer circumferential surface of the protruding portion are provided on a central side of the fixing portion.

12. A cover component for a disc brake, the disc brake including:

an attachment member that is fixed to a non-rotation portion of a vehicle and provided in a manner of straddling an outer circumferential side of a disc;

a first friction pad that is movably provided in the attachment member and disposed in a manner of facing one surface of the disc in an axial direction;

a second friction pad that is movably provided in the attachment member and disposed in a manner of facing the other surface of the disc in the axial direction;

a piston that pressurizes the first friction pad; and a caliper that accommodates the piston to be able to move in the axial direction of the disc and has a cylinder portion which has a cylinder hole accommodating the piston, a bridge portion which is provided in a manner of straddling the outer circumferential side of the disc from the cylinder portion, a claw portion which is provided in a manner of facing the cylinder portion in an axial direction of the cylinder hole from the bridge portion, and a recessed portion which is provided in the claw portion in a manner of facing the cylinder hole and has a groove on an inner circumferential surface;

wherein the cover component comprises:

a plate member that covers the recessed portion in the axial direction of the cylinder hole; and an interlock member that fixes the plate member to the caliper and has a fixing portion which is fixed to the plate member, a first inward side folded interlock piece which extends in the axial direction of the cylinder hole from the fixing portion and in which a first inward side tip portion folded to an inward side of the cylinder hole in a radial direction abuts the groove, and a first outward side folded interlock piece which extends in the axial direction of the cylinder hole from the fixing portion and in which a first outward side tip portion folded to an outward side of the cylinder hole in the radial direction abuts the groove.

* * * * *